US010295677B2

(12) United States Patent
Gotthold et al.

(10) Patent No.: US 10,295,677 B2
(45) Date of Patent: May 21, 2019

(54) SYSTEMS AND METHODS FOR DATA STORAGE AND RETRIEVAL

(71) Applicant: Battelle Memorial Institute, Richland, WA (US)

(72) Inventors: David W. Gotthold, Richland, WA (US); Andrew J. Stevens, Richland, WA (US); Nigel D. Browning, Richland, WA (US); Eric Jensen, Richland, WA (US); Nathan L. Canfield, Richland, WA (US); Alan G. Joly, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 15/589,413

(22) Filed: May 8, 2017

(65) Prior Publication Data
US 2018/0321390 A1  Nov. 8, 2018

(51) Int. Cl.
*G01T 1/115* (2006.01)
*G06F 3/03* (2006.01)

(52) U.S. Cl.
CPC ............ *G01T 1/115* (2013.01); *G06F 3/0325* (2013.01)

(58) Field of Classification Search
CPC .............................. G01T 1/115; G06F 3/0325
See application file for complete search history.

(56) References Cited

U.S. PATENT DOCUMENTS

| 3,633,037 | A | 1/1972 | Langenbeck |
| 5,004,918 | A | 4/1991 | Tsuno et al. |
| 5,051,585 | A | 9/1991 | Koshishiba et al. |
| 5,258,246 | A | 11/1993 | Berger et al. |
| 5,298,747 | A | 3/1994 | Ichikawa et al. |
| 5,395,738 | A | 3/1995 | Brades et al. |
| 5,401,932 | A | 3/1995 | Hashimoto et al. |
| 5,798,524 | A | 8/1998 | Kundmann et al. |
| 5,958,541 | A * | 9/1999 | Miller ............... G11B 7/00455 365/111 |
| 6,124,063 | A | 9/2000 | Dauksher |
| 6,310,341 | B1 | 10/2001 | Todokoro et al. |
| 6,812,473 | B1 | 11/2004 | Amemiya |

(Continued)

FOREIGN PATENT DOCUMENTS

WO   WO 2015/061037   4/2015

OTHER PUBLICATIONS

Aharon et al., "A: K-SVD: An Algorithm for Designing Overcomplete Dictionaries for Sparse Representation," IEEE Trans. Signal Process., 54:4311-4322 (Nov. 2006).

(Continued)

*Primary Examiner* — Marcus H Taningco
(74) *Attorney, Agent, or Firm* — Klarquist Sparkman, LLP

(57) ABSTRACT

A method includes directing a probe beam to a target that includes an array of data portions in a data storage medium arranged so that a beam area of the probe beam extends across a plurality of adjacent data portions, the array including a data portion subset with each data portion of the subset responsive to the probe beam to produce a response illumination, receiving the response illumination at a detector, and determining data values corresponding to the plurality of adjacent data portions based on the received response illumination. Apparatus and systems are also disclosed.

35 Claims, 14 Drawing Sheets

(56) References Cited

U.S. PATENT DOCUMENTS

| | | | |
|---|---|---|---|
| 6,992,965 B1* | 1/2006 | Glushko | G11B 7/1362 369/103 |
| 7,417,227 B2 | 8/2008 | Matsumoto et al. | |
| 7,465,923 B2 | 12/2008 | Nishiumi et al. | |
| 7,825,378 B2 | 11/2010 | Yakushevska et al. | |
| 7,834,795 B1 | 11/2010 | Dudgeon et al. | |
| 7,928,376 B2 | 4/2011 | Kaji et al. | |
| 8,125,549 B2 | 2/2012 | Dekel | |
| 8,190,007 B2 | 5/2012 | Meijer et al. | |
| 8,217,352 B2 | 7/2012 | Reed | |
| 8,334,512 B2 | 12/2012 | Luecken et al. | |
| 8,338,782 B2 | 12/2012 | Luecken et al. | |
| 8,553,994 B2 | 10/2013 | Tian et al. | |
| 8,648,955 B2 | 2/2014 | Kang et al. | |
| 8,725,784 B2 | 5/2014 | Davenport et al. | |
| 8,748,818 B2 | 6/2014 | Own et al. | |
| 8,772,716 B2 | 7/2014 | Buijsse | |
| 8,785,850 B2 | 7/2014 | Malac et al. | |
| 8,829,436 B2 | 9/2014 | Iijima et al. | |
| 8,907,280 B1 | 12/2014 | Larson et al. | |
| 8,933,401 B1 | 1/2015 | Reed | |
| 9,040,911 B2 | 5/2015 | Ogashiwa et al. | |
| 9,129,774 B2 | 9/2015 | Buijsse et al. | |
| 9,165,743 B2 | 10/2015 | Reed et al. | |
| 9,412,558 B2 | 8/2016 | Van Dyck et al. | |
| 9,620,330 B2 | 4/2017 | Potocek et al. | |
| 2001/0054697 A1 | 12/2001 | Yamashita | |
| 2002/0148962 A1 | 10/2002 | Hosokawa et al. | |
| 2003/0006373 A1 | 1/2003 | Koguchi et al. | |
| 2003/0218151 A1* | 11/2003 | Akselrod | B82Y 10/00 252/301.4 R |
| 2005/0220266 A1 | 10/2005 | Hirsch | |
| 2006/0239336 A1 | 10/2006 | Baraniuk et al. | |
| 2007/0228277 A1 | 10/2007 | Tsuneta et al. | |
| 2007/0284528 A1 | 12/2007 | Benner et al. | |
| 2008/0203296 A1 | 8/2008 | Terada et al. | |
| 2008/0254376 A1 | 10/2008 | Lin et al. | |
| 2009/0200464 A1 | 8/2009 | Tiemeijer et al. | |
| 2010/0252735 A1 | 10/2010 | Hytch et al. | |
| 2011/0168903 A1 | 7/2011 | Kyele et al. | |
| 2011/0192976 A1 | 8/2011 | Own et al. | |
| 2011/0210249 A1 | 9/2011 | Benner | |
| 2011/0220796 A1 | 9/2011 | Nicolopoulos | |
| 2012/0049060 A1 | 3/2012 | Luecken et al. | |
| 2012/0123581 A1 | 5/2012 | Smilde et al. | |
| 2013/0099115 A1 | 4/2013 | Glaeser et al. | |
| 2013/0126729 A1 | 5/2013 | Own et al. | |
| 2013/0193322 A1 | 8/2013 | Blackburn | |
| 2014/0061463 A1 | 3/2014 | Buijsse et al. | |
| 2014/0138542 A1 | 5/2014 | Inada et al. | |
| 2014/0140375 A1 | 5/2014 | Muqaibel et al. | |
| 2014/0166880 A1 | 6/2014 | Shiue et al. | |
| 2014/0224988 A1 | 8/2014 | Tamaki et al. | |
| 2015/0055745 A1 | 2/2015 | Holzner et al. | |
| 2015/0069233 A1 | 3/2015 | Anderson et al. | |
| 2015/0243474 A1 | 8/2015 | Lazic et al. | |
| 2015/0351705 A1 | 12/2015 | Brady et al. | |
| 2015/0371815 A1 | 12/2015 | Potocek et al. | |
| 2016/0111247 A1 | 4/2016 | Potocek et al. | |
| 2016/0276129 A1 | 9/2016 | Stevens et al. | |
| 2016/0301915 A1 | 10/2016 | Shechtman et al. | |
| 2017/0025247 A1 | 1/2017 | Stevens et al. | |
| 2017/0146787 A1 | 5/2017 | Reed | |

OTHER PUBLICATIONS

Arons et al., "Einstein's Proposal of the Photon Concept—a Translation of the Annalen der Physik Paper of 1905," American Journal of Physics, 33(5):367-374 (May 1965).

Baraniuk et al., "A Simple Proof of the Restricted Isometry Property for Random Matrices," Constructive Approximation, 28:253-263 (Dec. 2008).

Baraniuk, "Compressive Sensing," IEEE Signal Process. Mag., 24, 9 pages (Jul. 2007).

Binev et al., "Compressed Sensing and Electron Microscopy," Vogt et al. (eds.), Modeling Nanoscale Imaging in Electron Microscopy, Nanostructure Science and Technology, Springer, pp. 73-126 (Feb. 2012).

Binev et al., "High-Quality Image Formation by Nonlocal Means Applied to High-Angle Annular Dark-Field Scanning Transmission Electron Microscopy (HAADF-STEM)," Vogt et al. (eds.), Modeling Nanoscale Imaging in Electron Microscopy. Nanostructure Science and Technology, Springer, pp. 127-145 (Jan. 2012).

Bioucas-Dias et al., "Two-Step Iterative Shrinkage/Thresholding Algorithms for Image Restoration," IEEE Trans, Image Process., 16:2992-3004 (Nov. 2007).

Brand, et al., "Super-resolution in optical data storage," *J. Opt. A: Pure Appl. Opt.*, 1:794-800 (Nov. 1999).

Candès et al., "Uncertainty Principles: Exact Signal Reconstruction from Highly Incomplete Frequency Information," IEEE Trans, Inform. Theory, 52:489-509, (Jan. 2006).

Candès, "The Restricted Isometry Property and its Implications for Compressed Sensing," Comptes Rendus Mathematique, 346:589-592 (May 2008).

Candès, et al. "Towards a Mathematical Theory of Super-resolution," *Communications on Pure and Applied Mathematics*, 67(6):906-956 (Jun. 2012).

Chen et al., "Compressive Sensing on Manifolds Using a Nonparametric Mixture of Factor Analyzers: Algorithm and Performance Bounds," IEEE Trans, Signal Process., 58:6140-6155 (Dec. 2010).

DeLaRiva et al., "In-Situ Transmission Electron Microscopy of Catalyst Sintering," Catalysis, 308:291-305 (Sep. 2013).

Donoho, "Compressed Sensing," IEEE Trans, Inform. Theory, 52:1289-1306, (Apr. 2006).

Evans et al., "Controlled Growth of Nanoparticles from Solution with In-Situ Liquid Transmission Electron Microscopy," Nano Lett. 11:2809-2813 (Jul. 2011).

Fernandez-Granda, "Super-resolution and compressed sensing," *SIAM News*, 46(8), 2 pages (Oct. 2013).

Ferreira et al., "In-Situ Transmission Electron Microscopy," MRS Bull. 33:83-90 (Feb. 2008).

Foucart et al., "A Mathematical Introduction to Compressive Sensing," Springer, New York, 634 pages (Aug. 2013).

Gatan, "TEM Imaging & Spectroscopy," http://www.gatan.com/products/tem-imaging-spectroscopy, accessed Dec. 19, 2014, 5 pages.

Gershman et al., "A Tutorial on Bayesian Nonparametric Models," J. Math. Psychol. 56:1-12 (Feb. 2012).

Ghahramani et al., "The EM Algorithm for Mixtures of Factor Analyzers," Technical Report CRG-TR-96-1, University of Toronto, 8 pages (May 1996).

Gren et al., "Über einen die Erzeugung und Verwandlung des Lichtes betreffenden heuristischen Gesichtspunkt," Annalen der Physik, 14(S1):164-18 (2005).

Goris et al., "Electron Tomography Based on a Total Variation Minimization Reconstruction Technique," Ultramicroscopy, 113:120-130 (Feb. 2012).

Griffiths et al., "The Indian Buffet Process: An Introduction and Review," J. Mach. Learn. Res., 12:1185-1224 (Apr. 2011).

Haider et al., "Towards 0.1 nm Resolution with the First Spherically Corrected Transmission Electron Microscope," J Electron. Microsc. (Tokyo), 47:395-405 (Jan. 1998).

He et al., "Face Recognition Using Laplacianfaces," IEEE Trans, Pattern Anal. Mach. Intell., 27:328-340 (Jan. 2005).

Huang et al., "In-Situ Observation of the Electrochemical Lithiation of a Single $SnO_2$ Nanowire Electrode," Science, 330:1515-1520 (Dec. 2010).

International Search Report and Written Opinion from International Application No. PCT/US2016/023286, dated Aug. 5, 2016, 10 pages.

International Search Report and Written Opinion from International Application No. PCT/US2017/026664, dated Sep. 18, 2017, 15 pages.

Jinschek et al., "Image Resolution and Sensitivity in an Environmental Transmission Electron Microscope," Micron. 43:1156-1168 (Nov. 2012).

(56) References Cited

OTHER PUBLICATIONS

Jinschek, "Advances in the Environmental Transmission Electron Microscope (etem) for Nanoscale In-Situ Studies of Gas-Solid Interactions," Chem. Commun., 50:2696-2706 (Jan. 2014).
Kanaya et al., "Penetration and energy-loss theory of electrons in solid targets," Journal of Physics D: Applied Physics, 5(1): 43 (Jan. 1972).
Kanaya et al., "Secondary electron emission due to primary and backscattered electrons," Journal of Physics D: Applied Physics, 5(9):1727 (1972).
Kraemer, et al., "Ultra high-density optical data storage: information retrieval on order of magnitude beyond the Rayleigh limit," *Chemical Physics*, 285(1):73-83 (Dec. 2002).
Liao et al., "Generalized Alternating Projection for Weighted-f2,1 Minimization with Applications to Model-Based Compressive Sensing," SIAM J. Imaging Sci, 7:797-823 (Apr. 2014).
Llull et al., "Coded Aperture Compressive Temporal Imaging," Opt. Express, 21:10526-10545 (Apr. 2013).
Mairal et al., "Sparse Modeling for Image and Vision Processing," arXiv preprint arXiv:1411.3230, 205 pages (Dec. 2014).
McMullan et al., "Comparison of Optimal Performance at 300 keV of Three Direct Electron Detectors for Use in Low Dose Electron Microscopy," Ultramicroscopy, 147:156-163 (Dec. 2014).
Mehraeen et al., "A (S)TEM Gas Cell Holder with Localized Laser Heating for In-Situ Experiments," Microscopy Microanal, 19:470-478 (Apr. 2013).
Neal, "Markov Chain Sampling Methods for Dirichlet Process Mixture Models," J. Comput. Graph. Stat., 9:249-265 (Feb. 2000).
Nichelatti, et al., "Photoluminescence from colour centres generated in lithium flouride thin films and crystals by extreme-ultraviolet irradiation," Nuclear Intruments and Methods in Physics Research B, 268(19):3035-3059 (May 16, 2010).
Olshausen et al., "Emergence of Simple-Cell Receptive Field Properties by Learning a Sparse Code for Natural Images," Nature, 381:607-609 (Jun. 1996).
Potts, "Electron probe microanalysis," A Handbook of Silicate Rock Analysis, Blackie Academy, Chapman & Hall, Chapter 10, pp. 326-382 (1987).

Rasmussen, "The Infinite Gaussian Mixture Model," in NIPS, pp. 554-560, Denver, CO (1999).
Saghi et al., "Reduced-Dose and High-Speed Acquisition Strategies for Multi-Dimensional Electron Microscopy," Adv. Struct. Chem. Imaging, 10 pages (May 2015).
Seitz, "Color Center in Alkali Halide Crystals," Reviews of Modern Physics, pp. 384-408 (1946).
Stevens et al., "The Potential for Bayesian Compressive Sensing to Significantly Reduce Electron Dose in High-Resolution STEM Images," Microscopy, 63:41-51 (Oct. 2013).
Surrey et al., "Quantitative Measurement of the Surface Self-Diffusion on Au Nanoparticles by Aberration-Corrected Transmission Electron Microscopy," Nano Lett., 12:6071-6077 (Nov. 2012).
Tipping et al., "Mixtures of Probabilistic Principal Component Analyzers," Neural Comput., 11:443-482 (Feb. 1999).
Tipping et al., "Probabilistic Principal Component Analysis," J. R. Stat. Soc. Series B (Stat. Methodol.), 61:611-622 (1999).
Tsyganov et al., "Analysis of Ni Nanoparticle Gas Phase Sintering," Phys. Rev. B., 75, 9 pages (Jan. 2007).
Wakin, Manifold-Based Signal Recovery and Parameter Estimation From Compressive Measurements, arXiv preprint arXiv:1002.1247, 22 pages (Feb. 2010).
Xing et al., "Dictionary Learning for Noisy and Incomplete Hyperspectral Images," SIAM J. Imaging Sci. 5:33-56 (Jan. 2012).
Yang et al., "Gaussian Mixture Model for Video Compressive Sensing," 2013 20th IEEE International Conference on Image Processing (ICIP), pp. 19-23 (Sep. 2013).
Yoshida et al., "Visualizing Gas Molecules Interacting with Supported Nanoparticulate Catalysts at Reaction Conditions," Science, 335:317-319 (Jan. 2012).
Yuan et al., "Adaptive Temporal Compressive Sensing for Video," 2013 20th IEEE International Conference on Image Processing (ICIP), Melbourne, Australia, pp. 14-18 (Sep. 2013).
Yuan et al., "Low-Cost Compressive Sensing for Color Video and Depth," 2014 IEEE Conference on Computer Vision and Pattern Recognition (CVPR), IEEE, arXiv:1402.6932v1, 8 pages (Jun. 2014).
Zhou et al., "Nonparametric Bayesian Dictionary Learning for Analysis of Noisy and Incomplete Images," IEEE Trans. Image Process., 21:130-144 (Jan. 2012).

\* cited by examiner

SYSTEMS AND METHODS FOR DATA STORAGE AND RETRIEVAL

ACKNOWLEDGEMENT OF GOVERNMENT SUPPORT

This invention was made with government support under grant DE-AC05-76RL01830 awarded by the United States Department of Energy. The government has certain rights in the invention.

FIELD

The disclosure pertains to optically stimulated luminescence, computational imaging, super resolution, and data storage media.

BACKGROUND

Conventional optical disc data storage technologies record data in a data medium (such as a compact disc) by creating an array of physical features, such as pits or dye variations, with a writing laser beam directed to the surface of the data medium in a controlled manner. To extract the recorded data, a reading laser beam is directed to the physical features, and optical variations between pits or dyes and a reference, such as a flat un-pitted surface or a different dye color, are detected with a photodiode. For conventional optical discs, the amount of the data that can be stored is limited by the size of the read and write beams. In view of the ever-increasing amounts of data that are generated and stored, improvements in optical-based storage media that permit higher density storage devices are desirable.

SUMMARY

According to some examples of the disclosed technology, methods can include directing a probe beam to a target that includes an array of data portions in a data storage medium arranged so that a beam area of the probe beam extends across a plurality of adjacent data portions, the array including a data portion subset with each data portion of the subset responsive to the probe beam to produce a response illumination, receiving the response illumination at a detector, and determining data values corresponding to the plurality of adjacent data portions based on the received response illumination.

In further examples of disclosed technology, apparatus can include a data storage medium that includes an array of data markers, a probe beam source situated to produce a probe beam having a beam area at the array that extends over a plurality of data markers, a scanner situated to scan the probe beam across the array of data markers, an optical detector situated to detect a response illumination produced by the plurality of data markers in response to the probe beam and provide a mixed response illumination signal, and a computer configured with a super resolution solver so as to determine values of the array of data markers based on the mixed response illumination signal.

According to additional examples, of the disclosed technology, systems can include a memory coupled to at least one processor, the memory storing matrix data associated with an array of data markers of a storage medium, and a computer-implemented super resolution solver, stored in the memory, the super resolution solver for determining values stored in the data markers of the array based on a plurality of probe beam measurements of the array, wherein an area of the probe beam extends over a plurality of adjacent data markers of the array so that the probe beam measurements correspond to a combined response illumination signal that includes the values stored in the plurality of adjacent data markers under the probe beam area.

In further examples of the disclosed technology, apparatus can include an optically stimulated luminescence (OSL) storage medium including an array of OSL data markers situated to illuminate in response to optical stimulation, a probe beam source coupled to the OSL storage medium and situated to produce a probe beam spot that extends over a plurality of OSL data markers in the array so as to provide optical stimulation to the plurality of the OSL data markers, and a detector coupled to the array and situated to receive a response beam corresponding to the optical stimulation of the plurality of OSL data markers.

According to further examples of the disclosed technology, systems can include an ionizing radiation beam source situated to produce a modulated ionizing radiation beam and to focus the modulated ionizing radiation beam to a predetermined spot size at an OSL target situated to receive the modulated ionizing radiation beam, and a scanner situated to produce a movement between the ionizing radiation beam and the OSL target at a scan rate so as to produce a plurality of OSL active data regions in the OSL target corresponding to the scan rate and the modulation of the ionizing radiation beam at a pitch smaller than a read beam area used to access the OSL active data regions.

The foregoing and other objects, features, and advantages of the disclosed technology will become more apparent from the following detailed description, which proceeds with reference to the accompanying figures.

DETAILED DESCRIPTION

Figure 1:
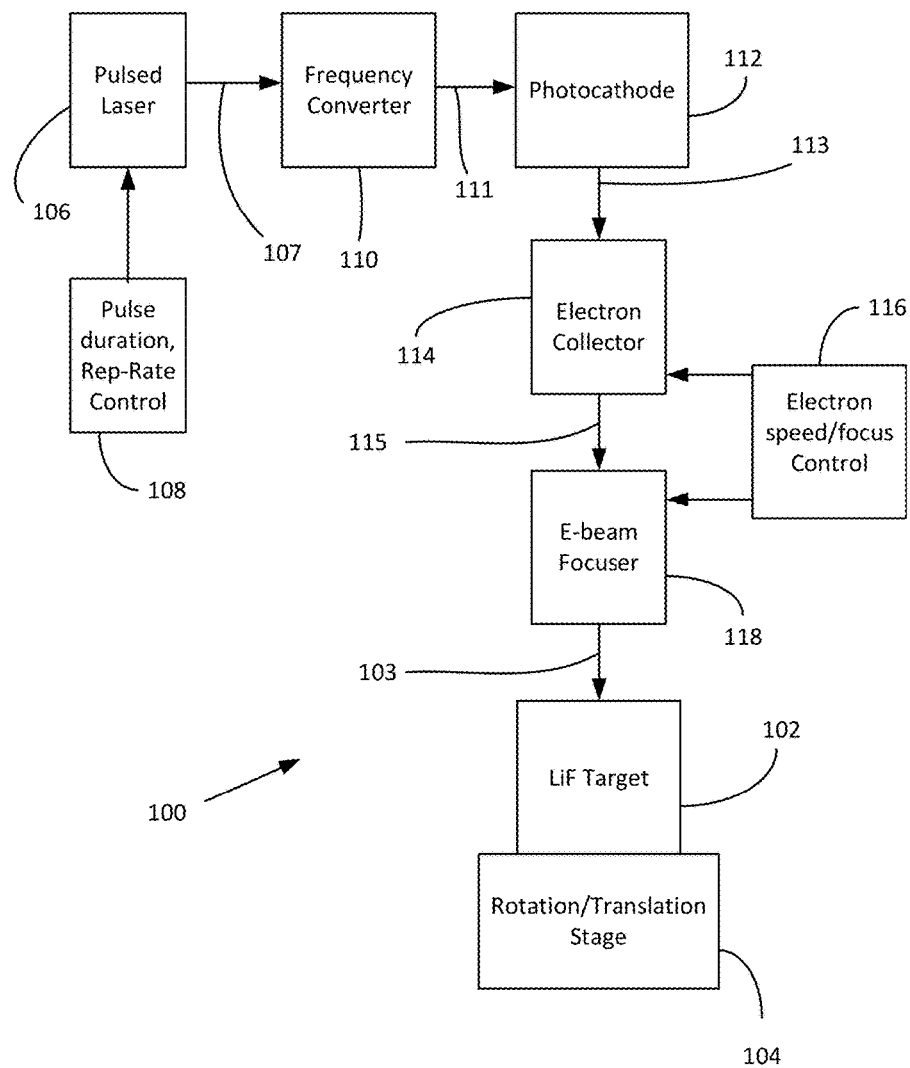
FIG. 1 is a schematic of an example system for forming OSL activated regions in a substrate.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

Some of the disclosed methods and apparatus generally pertain to particle beam-based data writing systems, such as those associated with charged particles such as electrons or positively or negatively charged ions. Also disclosed are electromagnetic beam-based data reading systems. As used herein, "radiation" or "radiation beam" or "ionizing radiation beam" refers to charged particle beams such as electron or ion beams, neutral particle beams such as neutron beams, electromagnetic radiation beams at wavelengths less than 400 nm such as extreme ultraviolet, soft X-rays, hard X-rays, and gamma ray wavelengths, or greater than infrared wavelengths such as far-infrared, microwave, millimeter wave, or longer wavelengths. Propagating electromagnetic radiation at wavelengths between 400 nm and 700 nm can be referred to as a visible beam. Visible, infra-red, and ultraviolet beams can also be used in data writing systems.

The term "signal" as used herein generally refers to a time-varying particle beam intensity or phase, or a time-varying electrical current or voltage. Detector signals are signals associated with reading beam reflections, diffractions, or response illuminations, including those provided by optical stimulated luminescence (OSL). Detector signals are typically processed as a time varying sequence of electrical currents or voltages. Herein, beam modulation can be provided in various ways, including with acousto-optic modulators, electro-optic modulators, beam scattering, masks, DMDs, optical choppers, spatial light modulators, absorptive or refractive modulators, etc. Beam modulation can also be provided through current or voltage modulation of beam generation sources and beam directing components.

Optically stimulated luminescence (OSL) generally refers to the luminescence effect associated with crystalline materials that have been altered with various doses of ionizing radiation. By controlling the ionizing radiation provided to a substrate that includes a layer of OSL material, various spots, shapes, arrays, and patterns of OSL activated regions can be formed in the substrate. The OSL activated regions can have different depths and fluorescence characteristics based on the exposure, duration, intensity, etc., of the ionizing radiation and the material concentrations, composition, crystalline structure, thickness, grain size, etc., of the layer or layers of OSL material. Probe beams directed to OSL activated regions can cause the OSL activated regions to produce response beams at various wavelengths and intensities based on the characteristics of the probe beam, such as wavelength and intensity. OSL activated regions also are responsive to probe beams to produce an OSL illumination with wavelength and intensity characteristics based on the parameters of the ionizing radiation used to form the activated regions. OSL activated regions can correspond to binary or multi-bit data structures that can be read by one or more probe beams.

Super resolution, as used herein, refers to techniques for recovering fine details from coarse-scale information. Usage of the term, and variations such as super resolve, are consistent with their ordinary meanings and understandings in the art. For example, Emmanuel J. Candes and Carlos Fernandez-Granda refer to super resolution as the process where the fine-scale structure of an object is retrieved from coarse-scale information only, from samples at the low frequency end of the measurement spectrum. For instance, given many point sources at unknown locations and with unknown complex-valued amplitudes, Fourier samples of this object up to a frequency cutoff $f_c$ can be observed. Super resolution techniques can be applied such that the locations and amplitude of the point sources can be precisely recovered by solving a convex optimization problem, which can be reformulated as a semidefinite program, provided that the distance between the point sources is at least $2/f_c$. The technique and results extend to higher dimensions and other models.

In some examples, compressive sensing principles, techniques, and algorithms can be used, adapted, and/or combined with super resolution techniques to deconvolve illumination data signals to determine stored data values. Compressive sensing generally refers to the techniques and algorithms that permit reconstruction of a signal by detecting or sampling below the Nyquist rate provided that the signal has a sparsity characteristic in some domain, such as the time domain, frequency domain, time-frequency domain, etc. and provided the signal is incoherent with respect to that domain. For example, in a conventional system, a signal having a single high frequency component would be sampled at twice this high frequency component in order to recreate the signal without loss. Because there is only one frequency component, the frequency domain for the signal is sparse. Using compressive sensing, knowledge of this sparsity can allow sampling the signal with minimal loss at a sampling rate substantially below the frequency of the single high frequency component (i.e., well below the Nyquist rate).

Using the approaches described herein, an effective areal data density of a data storage medium can be increased or data access time reduced by interpreting a data signal that contains a mix of data from a plurality of data markers at any given moment. As one example, a data storage medium is scanned with a probe beam having a spot extending across a plurality of densely situated data markers, and a mixed response from the multiple data markers is detected to form a signal. Alternatively, in a data storage medium having less densely arranged data markers, a probe beam having a larger spot that extends across a plurality of the less densely arranged data markers is scanned and a mixed response signal is detected.

The data markers are arranged in an array, and the probe beam is scanned across the array so that the spot of the probe beam advances to scan over each row of data markers in the array. With the probe beam spot extending over multiple data markers, the response from a particular data marker can be detected multiple times at different positions within the scanning probe beam spot. Upon acquisition of the signal, the data associated with the data markers can be unpacked as in various examples described below. In one example, at least 50% of the data markers are seeded with a zero value. In another example, a probe beam spot with a Gaussian intensity distribution extends across nine data markers during beam scanning, and each non-zero valued data marker has a bit depth greater than one. In general, data storage density can increase faster than a corresponding density reduction associated with seeding the data storage medium with zero value (or other known value) data markers.

Using super resolution, a data signal associated with a data storage array can include a mixture of separate illumination signals, and the separate signals can be accurately recovered subsequently with hardware and/or software. In data retrieval applications, super resolution techniques can be applied spatially so that multiple data markers are measured simultaneously. This can allow for an increase in data marker spatial density for stored data; spatial density that is beyond the diffraction limit of a read beam used to access the data markers, or an increase in a read beam spot size used to access an array of data markers. In OSL based data storage mediums, a compressed arrangement of multi-bit data markers can be formed with ionizing radiation, such as an electron beam, and the data markers can be read with an optical beam having a spot that extends of multiple data markers. The increase in data storage density can provide orders of magnitude improvement over conventional storage densities in optical discs, while maintaining signal to noise ratio associated with measurement and detection of the data markers.

Super resolution can be implemented in a variety of ways. In one example, super resolution is applied by solving sets of equations corresponding to a data signal associated with a data storage medium. The data signal is formed by scanning a probe beam spot with an intensity distribution across an array of data markers on the data storage medium. (In the following, boldface type is used to represent matrices.) A value $S_{ij}$ associated with a response beam measurement at a selected position in a data array can be represented as:

$$S_{ij} = \begin{bmatrix} W_{11} & W_{12} & \ldots & W_{ij} \end{bmatrix} \begin{bmatrix} A_{11} \\ A_{12} \\ \vdots \\ A_{ij} \end{bmatrix},$$

wherein $A_{ij}$ is the column vector of intensity values associated with each data marker $W_{ij}$ are intensity weight column vectors associated with each data marker ij in the array of data markers based on a vector of response beam measurements $S_{ij}$. This representation can be simplified as $S_{ij} = \Phi_{ij} a_{ij}$, wherein $$a_{ij} = \begin{bmatrix} A_{11} \\ A_{12} \\ \vdots \\ A_{ij} \end{bmatrix} \text{ and } \Phi_{ij} = \begin{bmatrix} W_{11} & W_{12} & \ldots & W_{ij} \end{bmatrix}.$$

Thus, each row of $\Phi_{ij}$ corresponds to different response beam measurements $S_{ij}$ of the array of data markers. In typical examples, the number of measurements or the scan movement of the probe beam spot corresponds to the number of data markers in the array of data markers.

Stored data can be retrieved with a probe beam spot that is larger than the individual data markers provided the array of data markers has suitable spacing between data markers. In one example, a data marker pitch $\Delta d$, that is greater than a super resolution cutoff frequency condition allows for stable recovery of the data marker positions. One theoretical description of such a condition is $\Delta d > 2/f_C$, where $f_C$ is a cutoff frequency. Other theoretical descriptions are possible, though in general none of the described theories necessarily constrains the scope of various embodiments of the disclosed technology described herein. Furthermore, various features described herein can be combined to vary effective separation distance and cutoff frequency, including bit depth, multiple wavelength probing or response, data seeding, beam modulation, diffraction patterns, etc. In some examples, a data marker pitch can be lower than a super resolution cutoff frequency condition, and the array of data markers can be effectively adjusted by providing data markers with a predetermined value, such as zero, in various ways including randomly or with predetermined locations. The seeding of zeroes to the data marker array, for example, can provide or increase a sparsity characteristic that allows the use of compressive sensing algorithms to solve the super resolution problem of reading the stored data or an increase in a confidence level or signal to noise ratio of an applied algorithm. As the response beam measurements are temporarily stored, the weight matrix produces a set of corresponding equations with several unknowns that can be solved with one or more techniques. Also, because the beam measurements and the stored data values are nonnegative, the sparsity of the weight matrix and intensity value vector is improved to further enhance the applicability of the computational imaging approaches, including super resolution. Using one or more regularization techniques, the set of equations representing the super resolution problem is no longer intractable and can be solved in polynomial time. In some examples, the positions of the seeded zero valued data markers are known and a nonnegative least squares solver is used to determine the value of the remaining data markers. In other examples, the positions of the seeded zero valued data markers are not known, and a nonnegative lasso (least absolute shrinkage and selection operator) or nonnegative approximate message passing algorithm is used. In further examples, a suitable portion of the data markers are zero valued so as to allow various super resolution approaches to be used to extract the remaining non-zero values, but the zero values of the suitable portion of data markers correspond to actual data instead of seeded zero values. In some data retrieval examples with seeded data marker values provided, super resolution problems herein can be solved at least in part with algorithms associated with compressive sensing, including one or more $l^1$ norm optimizations to reconstruct individual data marker values using a matrix of intensity weights.

FIG. 1 shows a representative system 100 for forming OSL activated regions in an OSL target 102. The target 102 includes a material responsive to an ionizing radiation beam 103, such as high-energy electrons, to form activated regions. Suitable materials can include LiF, NaCl, NaF, and $Al_2O_3$, by way of example. In one example, films of LiF were deposited on sapphire and polycarbonate substrates at thicknesses ranging from 100 nm to 1 μm. A scanning system 104 is coupled to the target 102 to move by rotating or translating the target 102 so that spots, lines, or other shapes can be formed for the activated regions. For example, the target 102 can have a disc shape so that the ionizing radiation beam 103 can form a plurality of activated regions as the target 102 is rotated that correspond to data so that the target 102 can be used as a data storage medium. In some examples, the scanning system 104 can move the ionizing radiation beam 103 relative to the target 102 which can be fixed or moving.

Various techniques can be used to produce ionizing radiation suitable for generating OSL activated regions. In the system 100, a pulsed laser source 106 is situated to produce optical pulses 107 of a predetermined fixed or variable duration, wavelength, and repetition rate. A controller 108 is coupled to the pulsed laser source 106 to control power and characteristics of the optical pulses 107. For example, a pulsed fiber laser alone, coupled to a fiber amplifier, or another pulse source, can generate pulses at an infrared wavelength (e.g., 1064 nm) with sub-nanosecond pulse durations suitable for frequency conversion. In representative embodiments, the particle density of the ionizing radiation beam 103 (which can be generated with a photocathode 112, as discussed hereinbelow) can be controlled with the controller 108 by varying the pulse power of the optical pulses 107. Corresponding OSL activated regions can be responsive to different densities of the ionizing radiation beam 103 so that an increase in density corresponds with an increase in a responsive illumination level. Based on a saturation of $10^5$ electrons, the responsive illumination level can correspond to a bit depth of 16 bits depending on the extent to which the density of the ionizing radiation beam 103 can be controlled. Electron densities can be varied up to and past a saturation level of the target 102. Suitable acceleration voltages for the electrons are typically in the range of 1 kV-10 kV.

A frequency converter 110 receives the optical pulses 107 and produces a frequency converted output beam 111 that is directed to a photocathode 112 or other electron source. For example, a beam at 1064 nm can be frequency converted to 266 nm or another suitable frequency that corresponds to the work function of the metal target of the photocathode 112 for electron emission. The photocathode emits electrons 113 that are collected and accelerated with an electron collector 114 to form an accelerated stream of electrons 115. The electrons are accelerated with a controlled electric field generated by, e.g., an arrangement of electrodes. The electric field can be varied with an electron speed/focus controller 116 that can vary the voltage associated with the electric field to correspond with a desired speed and energy for the accelerated stream of electrons 115. An electron beam focuser 118 receives the electrons 115 and focuses the electrons to form the ionizing radiation beam 103 with a spot size that is generally smaller than diffraction limited spots associated with optical wavelengths, such as wavelengths of 400 nm or longer. In some examples, spot sizes of less than 10 nm can be achieved using a focused electron beam. Corresponding feature sizes of OSL activated regions produced with the focused electron beam can be smaller than 50 nm in some examples.

Figure 2:
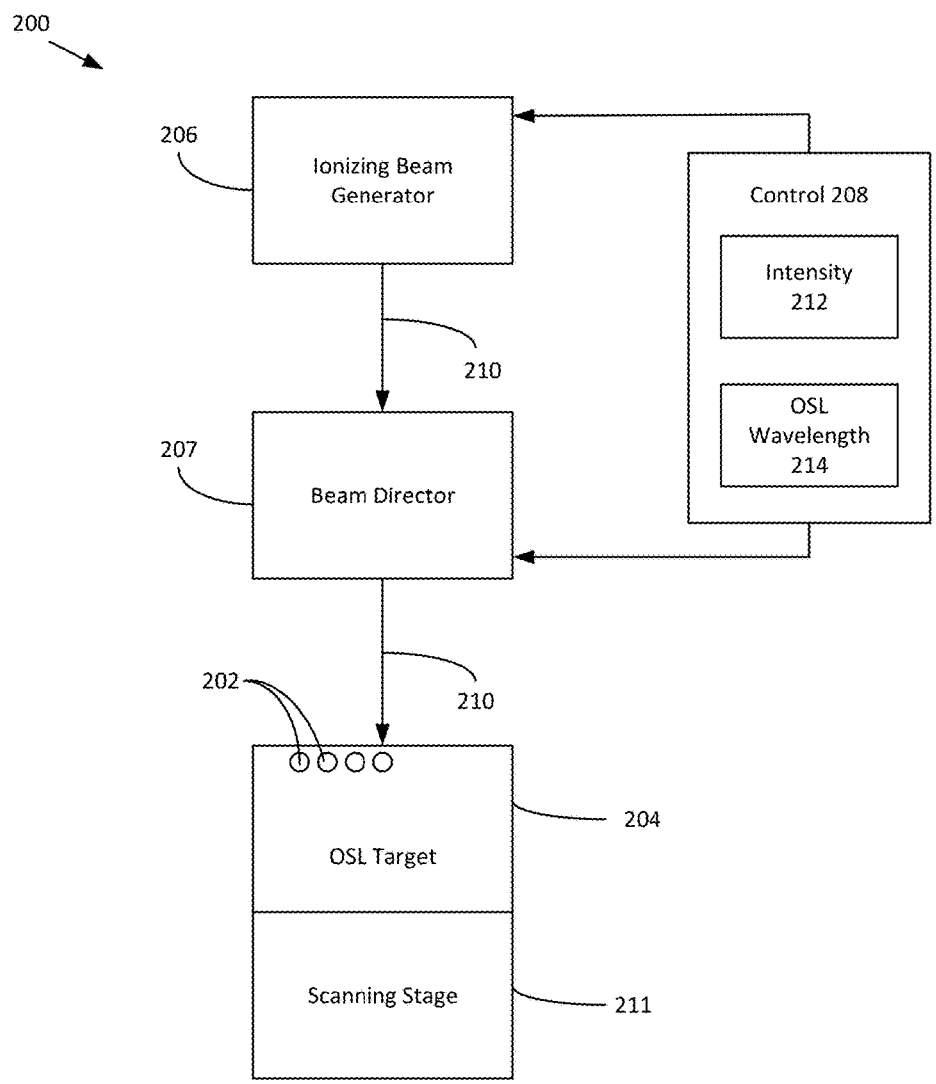
FIG. 2 is another schematic of an example system for forming OSL activated regions in a target.

FIG. 2 illustrates a system 200 for writing OSL spots 202 on an OSL target 204. The system 200 includes an ionizing beam generator 206 coupled to a controller 208. The ionizing beam generator 206 generates an ionizing beam 210 that can be an electron beam, x-ray beam, gamma beam, or a beta beam in some examples. The ionizing beam 210 is directed to the OSL target 204 with a beam director 207 that can include an optical system situated to direct, redirect, and/or focus the ionizing beam 210. In general, the particle characteristics of the ionizing beam 210 are selected so that the corresponding ionizing particles can produce OSL defects, such as the OSL spots 202, in the OSL target 204 that are smaller in size than a diffraction limited spot area of a corresponding reading beam (e.g., an ultraviolet read beam). With the smaller area of the OSL spots 202, multiple OSL spots can be arranged within the spot area of the reading beam. A scanning stage 211 is coupled to the OSL target 204 and is situated to provide scanning of the ionizing beam 210 relative to the OSL target 204.

In representative examples, the intensity of the ionizing beam 210 is varied with the controller 208 with an intensity control 212 and corresponds to a multi-bit encoding level associated with a response illumination of the OSL spot 202. In typical examples, the multi-bit encoding level is linearly related or approximately linearly related to the intensity of the ionizing beam 210 across a predetermined range of response illumination, though other relations are possible. The linearity and saturation levels for the generation of OSL defects can vary between different types of radiation and applied acceleration voltages. The controller 208 includes a wavelength control 214 that can vary the response illumination wavelength characteristics of the OSL spots 202 based on the acceleration voltage (or other characteristics) used to form the ionizing beam 210. For example, the OSL spots 202 can include a multi-bit encoded level that corresponds to the response illumination of the probe beam illuminated OSL spots 202, and the OSL spots 202 can also include a plurality of wavelength peaks with an intensity level or relative intensity between peaks that also corresponds to the response illumination of the probe beam illuminated OSL spots 202.

Figure 3:
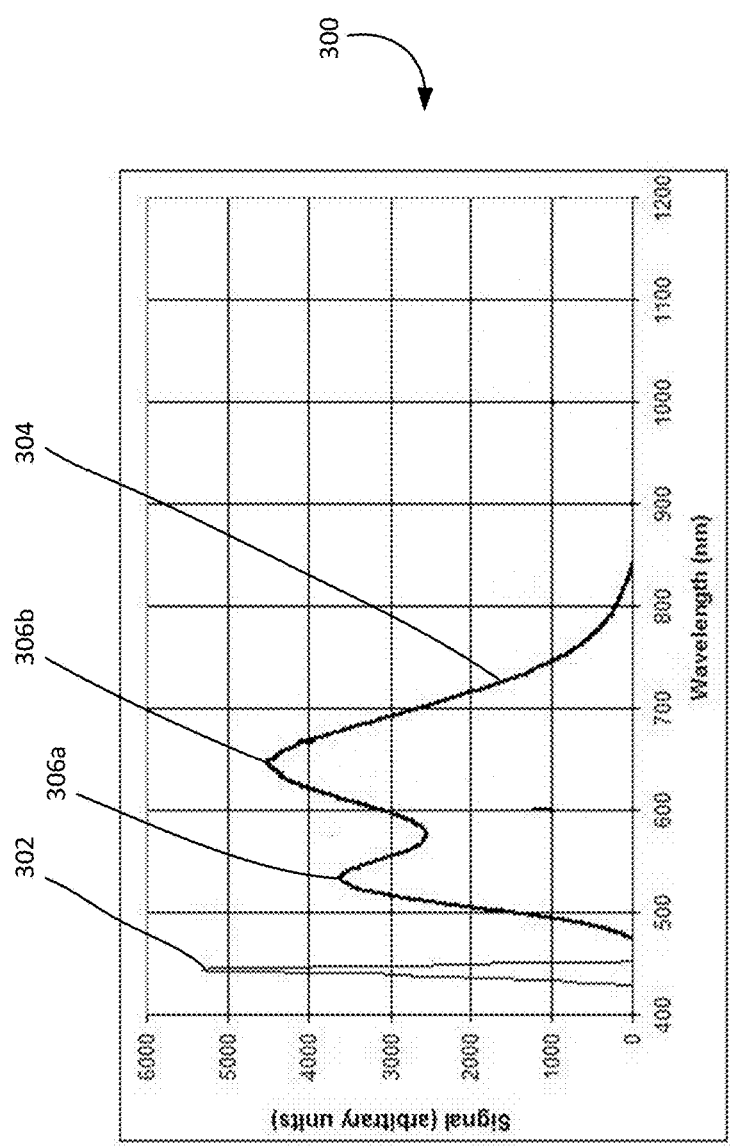
FIG. 3 is a graph of optical stimulated luminescence in response to a probe beam.

FIG. 3 is a graph 300 of illumination probe and response for an OSL defect target. A probe beam having a probe beam intensity spectrum 302 is directed to the OSL defect. For example, the probe beam can be produced by a laser diode that generates a relatively narrow band output at approximately 450 nm. In response to the probe beam, the OSL defect provides a response illumination having a response illumination intensity spectrum 304 that is different from the probe beam intensity spectrum 302 and typically broadened and shifted to longer wavelengths.

The response illumination intensity spectrum 304 also includes a plurality of response illumination intensity peaks 306a, 306b that are wavelength spaced apart and centered at approximately 530 nm and 650 nm. Intensity peaks can also be defined by wavelength ranges or bands, such as 2 nm, 5 nm, 10 nm, 50 nm, or greater. Detectors used to detect response illumination intensity can have detection bands that correspond to all or a portion of an intensity peak. In some examples, the plurality of response illumination intensity peaks 306 can include three or more peaks. In further examples, the ratio of intensity between the response illumination intensity peaks 306a, 306b can be varied with process parameters associated with OSL defect formation such as ionizing beam characteristics, including particle energy and particle type, and substrate structure, including surface layer reflectivity, substrate absorption, etc. In particular embodiments, in response to a corresponding probe beam the response illumination intensity peak 306a remains fixed for a plurality of OSL defects and the response illumination intensity peak 306b is varied for the same plurality of OSL defects.

In further examples, additional probe beams are used having one or more intensity spectra offset from the probe beam intensity spectrum at 450 nm. The corresponding response illumination intensity spectrum for a common OSL defect can be different from the response illumination intensity spectrum 304. In some examples, the multiple wavelength peaks of the OSL response illumination can be associated with additional data or dimensions of additional data. In some embodiments, the multiple wavelength peaks of the OSL response illumination are associated with a signal to noise ratio improvement in the access of stored data. For example, the intensity level of a first wavelength peak for an OSL defect stimulated with a probe beam can provide a reference intensity baseline to compare a second wavelength peak associated with the OSL defect. A variation in a ratio of response illumination intensities detected at the first and second wavelength can be associated with a scratch, defect, subnominal read condition, or other data storage or read error. A deviation from an expected value for a reference intensity of a selected response illumination wavelength peak can also correspond to a data read error. In some examples, a fluorescent or phosphorescent layer is added to the OSL target to provide a baseline or reference illumination with a corresponding wavelength different from the response illumination wavelengths of the OSL defects.

Figure 4:
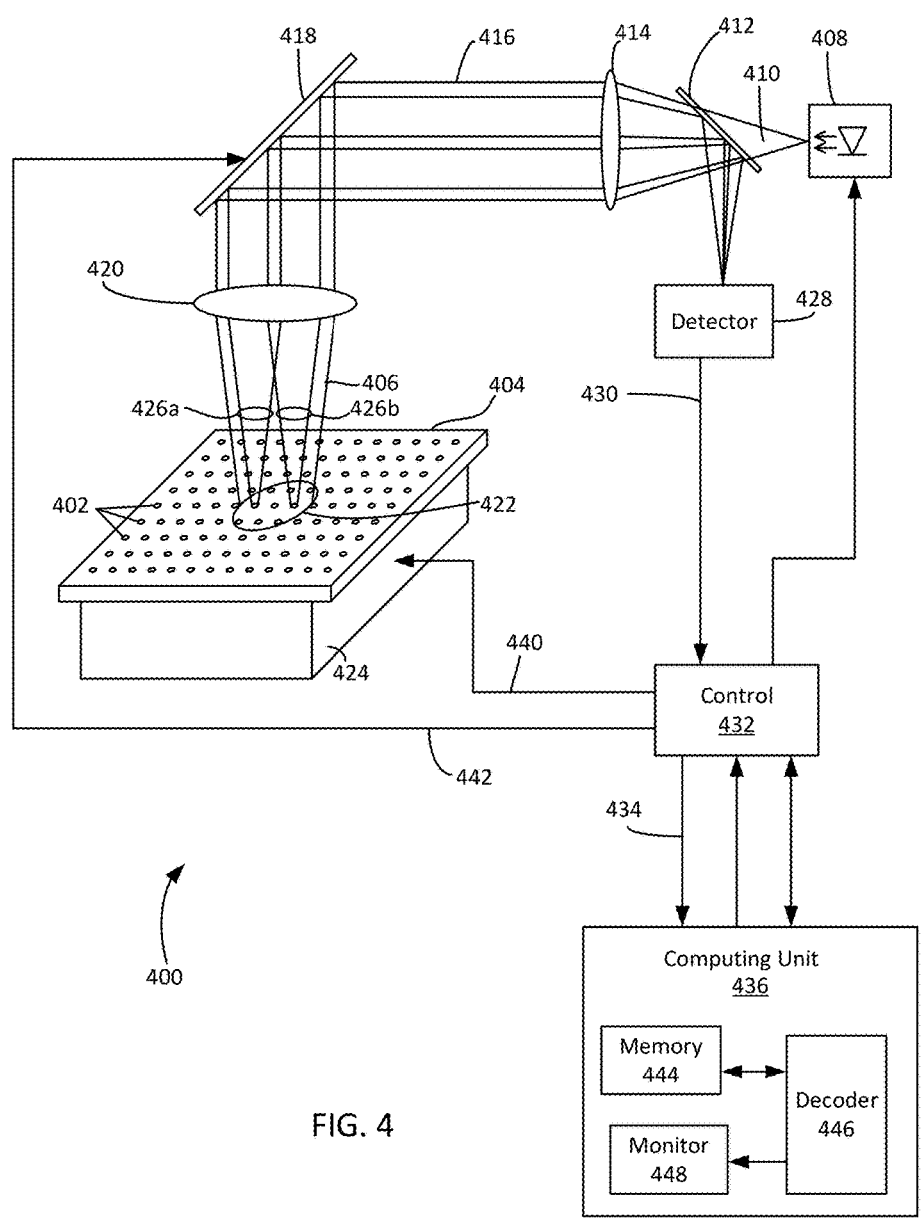
FIG. 4 is a schematic of an example system for accessing a data storage medium.

FIG. 4 shows a representative embodiment of a data read system 400 situated to read data markers 402 on a data storage medium 404 with a probe beam 406 generated with a probe beam source 408. The data markers 402 typically include a plurality of circular OSL spots or other OSL geometric formations, such as lines, squares, or other structures. OSL spots can be produced or written into the data storage medium 404 with a data writing system, such as the systems shown in FIGS. 1 and 2. OSL spots can be produced that can provide a selected response illumination level corresponding to a selected value, such as binary one or zero, and adjacent regions without OSL spots can correspond to an opposite value, such as a binary zero or one. In other examples, OSL spots can provide a selected response illumination level that corresponds to a higher order multi-bit signal. In some examples, the probe beam source 408 is a laser diode operating at a selected wavelength in the visible or non-visible spectrum, such as ultraviolet, green, infrared, etc. The probe beam source 408 emits a diode beam 410 that is directed through a beam splitter 412 and collimating lens 414 to form a collimated beam 416. A beam director 418 such as a reflective surface receives and directs the collimated beam 416 to a focusing objective 420 situated to focus the probe beam 406 to a probe spot 422 that extends so as to illuminate a plurality of the data markers 402 on the data storage medium 404.

The probe spot 422 can have a circular shape, oblong shape (e.g., elliptical) and the intensity distribution of the probe spot 422 is typically Gaussian so as to provide the smallest size possible in accordance with the diffraction limit. The area of the probe spot 422 that is Gaussian is typically defined with suitable boundary selection, such as the line corresponding to $1/e^2$ of peak intensity, though other measures are possible. In additional examples, the intensity distribution is Gaussian but the probe spot 422 is defocused so as to have a larger area to extend over multiple data markers 402. In further examples, the intensity distribution is top-hat (uniform), super Gaussian, or another selected distribution. In some embodiments, the probe spot 422 has an asymmetric and can be associated with an asymmetric divergence. A scanning stage 424 is coupled to the data storage medium 404 and situated to produce a relative movement of the data storage medium 404 and the probe beam 406 so that the probe beam 406 extends over different data markers 402 at different times. The beam director 418 can be used separate or in combination with the scanning stage 424 to produce the relative movement. The relative movement can be translational or rotational or a combination.

Each OSL spot that receives a portion of the probe beam 406 produces a response beam, such as example response beams 426a, 426b according to the characteristics of the probe beam 406 and the illuminated OSL spot. For example, the probe beam 406 can be sufficiently bright so that the probe spot 422 having a non-uniform distribution (e.g., Gaussian) illuminates each OSL spot within the probe spot area above an OSL saturation threshold. OSL spots illuminated above the saturation threshold typically emit light that is no longer proportional to the power of the probe beam 406. In other examples, the probe beam 406 peak intensity is selected to be at or below the saturation threshold. In further examples, the peak intensity of the probe beam 406 is selected above the saturation threshold but other portions of the probe beam 406 (e.g., Gaussian tails) are at or below the OSL saturation threshold.

The response beams 426a, 426b are emitted from the corresponding OSL spots and at least a portion of the emitted beams are coupled through the focusing objective 420 and collimating lens 414 and reflected at the beam splitter 412 to be received by an optical detector 428, such as a photodiode. In some examples, the optical detector 428 can be coupled to the probe spot 422, or an area adjacent to or overlapping the probe spot 422, with a separate optical path. The coupling of the optical detector 428 to the probed data markers 402 can be based on the response time characteristics of the data markers 402. The optical detector 428 produces a detector signal 430 corresponding to a mixed sum of the powers of the response beams 426a, 426b received by the optical detector 428. The optical detector 428 typically includes detector optics that provide a field of view that extends over the probe spot 422 that illuminates the data markers 402. In some examples, the field of view is larger or smaller than the probe spot 422. While a common optical path can be used, such as that allowed by the beam splitter 412, in some examples, the optical detector 428 can have a separate adjacent optical path for the response beams 426a, 426b.

A controller 432 is situated to receive the detector signal 430 and pass through or send a modified signal 434 to a computing unit 436. The controller 432 can also provide a continuous or modulated probe beam signal 438 to the probe beam source 408 and a scanning stage signal 440 and/or beam director signal 442 to the scanning stage 424 and beam director 418, respectively. The computing unit 436 includes a memory 444 coupled to a signal decoder 446 that deconvolve the mix of response beams 426a, 426b received by the detector 428 so that data values associated with the separate data markers 402 can be determined. In some examples, the illumination level corresponding to a data bit depth of greater than one in separate OSL spots can also be determined. The larger data bit depth can be based on the characteristics of the write beam used to produce the OSL spots. The values associated with the data markers 402 are extracted out from the detector signal 430 in the form of the data output 448 using one or more super resolution algorithms performed with the decoder 446. The data output 448 is retrieved from the data storage medium 404 with the probe beam 406 having a probe spot 422 that is larger than the pitch of the data markers 402 situated on or in the data storage medium 404 thereby allowing an increased data storage density for the data storage medium 404. In some examples, beams used to generate the data markers 402 have a spot size in the range 10-20 nm, which can represent a 100× increase in areal density based on a 10× increase in track pitch and a 10× increase in linear pitch when read with a 405 nm probe beam. Other lower density increases are also possible, including densities generally higher than about one physical feature per 0.12 $\mu m^2$. In representative embodiments, deconvolution of the response beams 426a, 426b by the computing unit 436 is performed within a sufficiently short time so that the process of accessing the data is practical in data storage applications. For example, the deconvolution process can be comparable to or faster than conventional hard drive data storage (or other data storage) read or access times, such as within seconds, milliseconds, microseconds, or shorter.

Figure 5A:
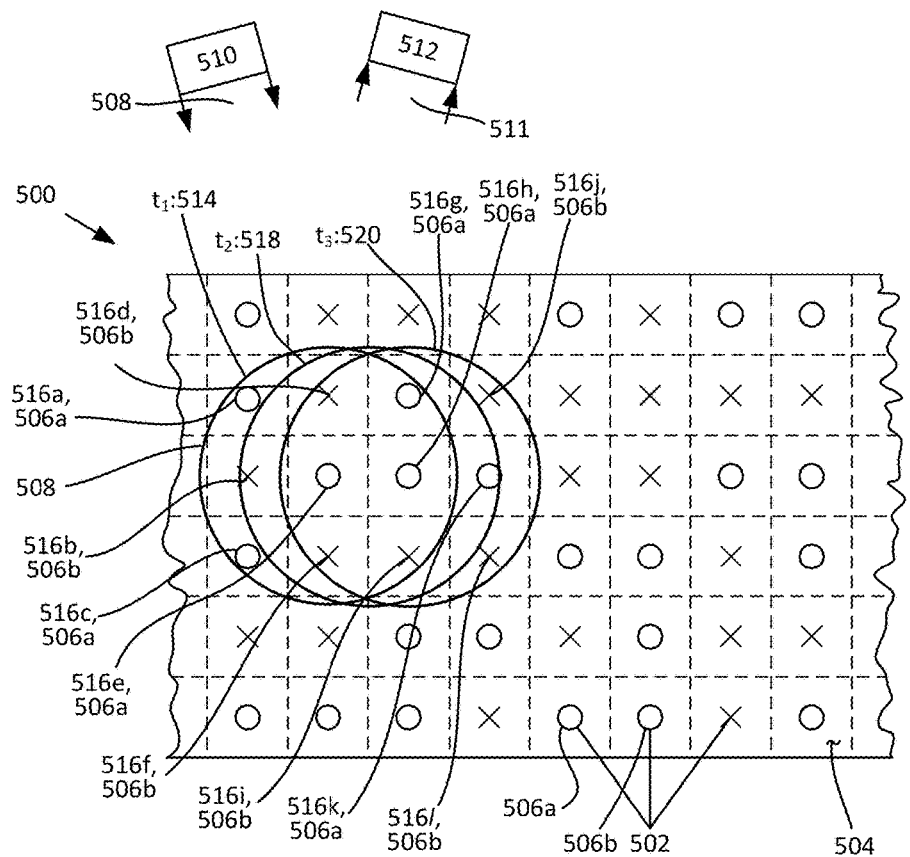
FIG. 5A is a close-up plan view of an example data storage array.

FIG. 5A shows an array 500 of data storage markers 502 situated in a data storage medium 504. The data storage markers 502 can include a plurality of OSL spots 506a that are responsive to a probe beam 508, emitted from a probe beam source 510, to emit corresponding response illumination 511, received by response illumination detector 512. The data storage markers 502 can also include a plurality of null spots 506b that can include areas where OSL spot formation is not performed or where OSL spot formation is performed producing spots with a response illumination level at a fixed level or different from the illumination levels associated with OSL spots 506a (e.g., 0%, 5%, 10%, 20%, 50%, or greater as compared to the OSL spots 506a in response to a fixed peak intensity of the probe beam 508). The null spots 506b can also include areas where other types of data storage medium writing is not performed or performed to produce a fixed or predetermined detectable illumination level, such as a zero or maximum reflectance associated with a probe beam.

Figure 5B:
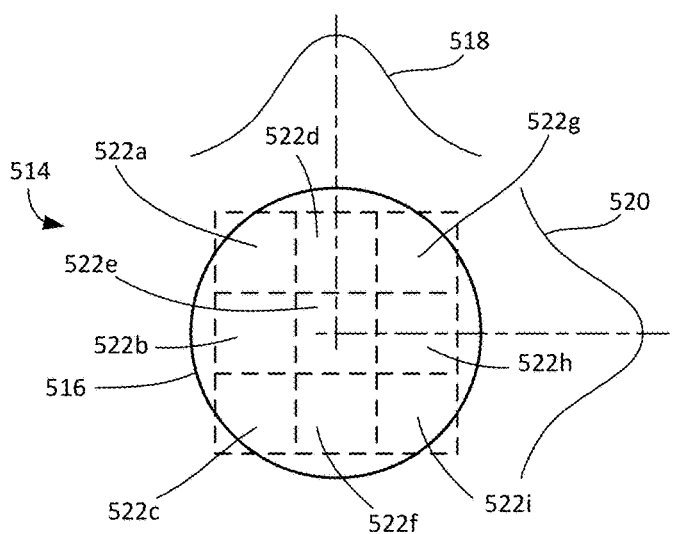
FIG. 5B is a schematic plan view of a probe beam spot with adjacent corresponding intensity distributions.

In FIG. 5B, an intensity weight mapping 514 is shown that includes a probe beam 516 having $1/e^2$ intensity distributions 518, 520 that extend over a 3×3 grid. A normalized intensity value of one for the probe beam 516 is associated with a center position of a center grid member 522e, a normalized intensity value of $e^{-1/2}$ is associated with center positions of side grid members 522b, 522d, 522f, 522h, and a value of $e^{-1}$ is associated with center positions of corner grid members 522a, 522c, 522g, 522i. Other grids can be formed, including 2×2, 4×4, 5×5, 2×3, 3×2, etc., and other intensity distributions, including non-symmetric, uniform, etc., can be used. Spots formed by the probe beam 516 can be circular, non-circular, elliptical, square, rectangular, etc. The intensity weight mapping 514 can be used with the array 500 to compare with detected response illumination values and one or more super resolution approaches to determine values of the data storage markers 502.

In representative embodiments, to provide the super resolution algorithms with sufficient data marker separation distance and/or sparsity to efficiently deconvolve the mixed intensity data associated with the data storage markers 502, a suitable quantity or percentage of the null spots 504b are arranged randomly or pseudo-randomly in the array 500 among the OSL spots 504a. The null spots 504b have a predetermined value associated with them, such as zero or another value. In the representative array 500 shown in FIG. 5A, 50% of the data storage markers 502 in the area shown are the null spots 504b and are represented schematically with an "x."

As shown in FIG. 5A, the probe beam 508 scans relative to the data storage medium 504 so as to impinge on different pluralities of adjacent data storage markers 502 at different times. For example, at a time $t_1$, a probe spot 514 extends across nine data storage markers 516a-516f, five of which are OSL spots 506a and four are null spots 506b, with a center position of the probe spot 514 aligned with a center of the data storage marker 516e. At a time $t_2$, the probe beam 508 or data storage medium 504 moves so that a probe spot 518 extends to cover data storage markers 516b, 516d-516f, 516k but with a different optical intensity that corresponds to the coverage of the intensity distribution of the probe spot 518 in the new position. At a time $t_3$, a probe spot 520 is at an adjacent position that extends over data storage markers 516d-516l with a center position of the probe spot 520 being situated over the data storage marker 516h. In representative examples, the response illumination 511 is detected at times $t_1$ and $t_3$ where the probe spots 514, 520 are situated over the data storage markers 516e, 516h, respectively.

Figure 5C:
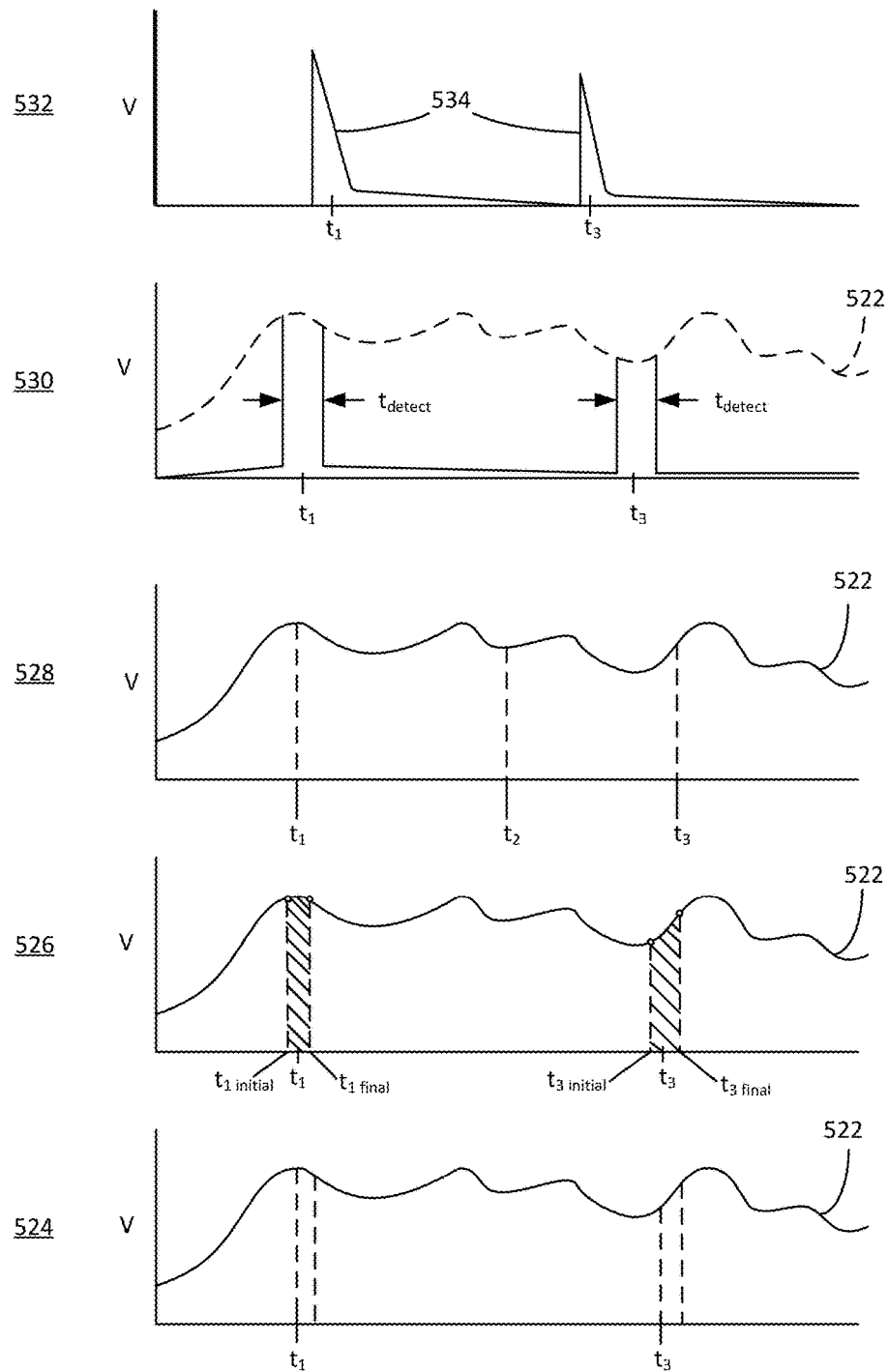
FIG. 5C are five graphs of a response illumination signal with respect to time.

With further reference to FIG. 5C, an intensity signal 522 is shown that corresponds to the intensity of the response illumination 511 directed to optical detector 512 from the data storage markers 516a-516l illuminated with the probe beam 508. In the graph example 524, the detector 512 samples the intensity signal 522 with a predetermined delay after times $t_1$ and $t_3$ so as to provide a sufficient time that corresponds with the response time of the OSL spots 506a. In some examples, the delay is selected to be in the range of 10 ps to 10 ns or longer and can be varied as needed. In the graph example 526, the detector 512 provides samples at time $t_{1\text{-}initial}$ and $t_{1\text{-}final}$ and $t_{3\text{-}initial}$ and $t_{3\text{-}final}$, at multiple times between the respective initial and final times, or for a continuous time between the respective initial and final times. In the graph example 528, the detector 512 samples the intensity signal 522 at times $t_1$, $t_2$, and $t_3$ so as to include detection samples that are mid-way or at other selected times or corresponding probe beam positions between the times $t_1$ and $t_3$. In graph example 530, the detector 512 receives the intensity signal 522 for a fixed sampling duration $t_{detect}$ that corresponds to the times $t_1$, $t_3$. In the graph example 532, the probe beam 508 is delivered in pulses that correspond to the times $t_1$, $t_3$ so that an intensity signal 534 is produced in response that corresponds to the pulses from the probe beam 508. Thus, in various examples, the probe beam 508 can be delivered or the response illumination 511 is detected or sampled in variable or discontinuous fashion, such as pulsed, chopped, or otherwise modulated, and the modulation can be synchronized to the scanning of the probe beam 508 or response illumination detector 509 in relation to the position of the data storage markers 502. One or more rows, columns, or groupings of data storage markers 502 can be situated with predetermined values to assist with or to confirm alignment or synchrony of the probe beam 508 and the data storage medium 504.

Figure 6A:
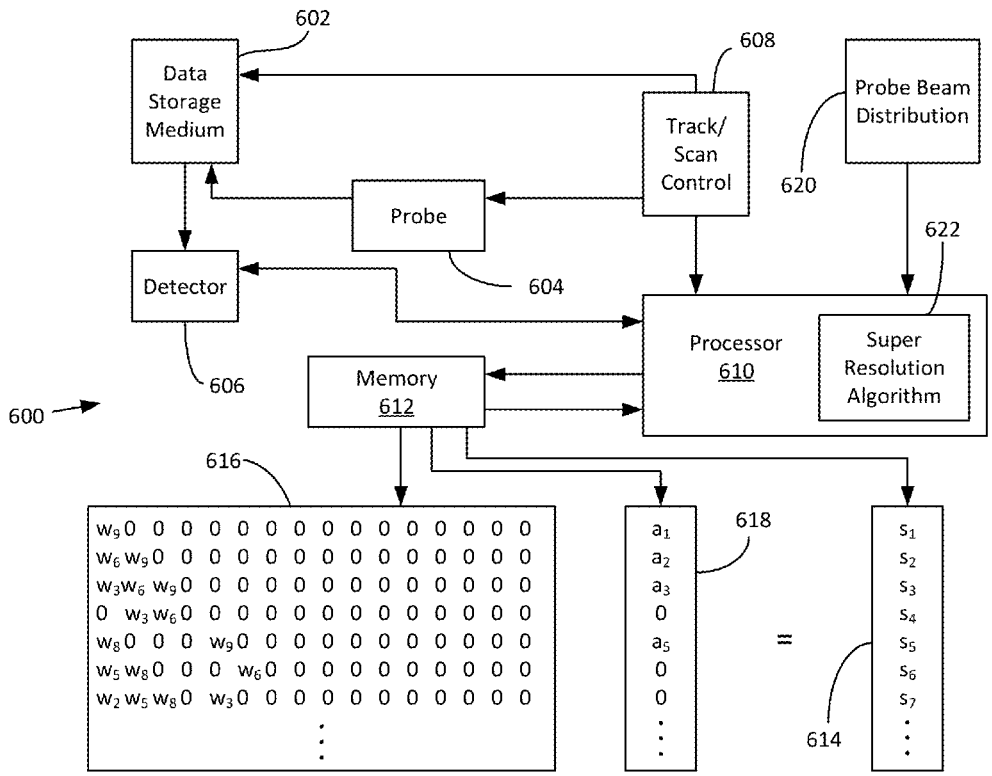
FIG. 6A is a schematic of an example data retrieval system.

FIG. 6 depicts a data retrieval system 600 that includes a data storage medium 602 coupled to a probe beam unit 604 and a probe beam detector 606. The data storage medium 602 can include a plurality of OSL-based or other data markers written into a substrate of an optical disc. A track/scan control unit 608 is coupled to the data storage medium 602 and the probe beam unit 604 so as to control the relative movement of a probe beam generated by the probe beam unit and the data markers of the data storage medium 602. A processor 610 is coupled to the to the track/scan control unit 608 and directs the movement of the scanning of the probe beam relative to the data storage medium so as to read the data markers. The processor 610 is also coupled to the probe beam detector 606 so as to receive a probe beam detection signal associated with the probe beam directed to the data storage medium and to gate, reset, or otherwise control the probe beam detector 606.

The processor 610 is further coupled to a memory 612 that stores measurements from the probe beam detector 606 in a measurement matrix 614. The memory 612 also stores probe beam intensity weights in a weight matrix 616 and computed data marker values in a data matrix 618. The measurement matrix 614 includes a column of measurement values $s_{ij}$ corresponding to an equal number of data markers that are scanned by the probe beam. The data matrix 618 includes a column of data values $a_{ij}$ that correspond to the data markers that are scanned. The processor 610 uses a probe beam distribution matrix 620 that is associated with the intensity distribution of the spot of the probe beam as received by the data markers of the data storage medium 602 and one or more super resolution algorithms 622 to determine the weight matrix 616 and the data matrix 618. Thus, the spot size of a writing beam used to produce the data markers of the data storage medium 602 can be smaller than the spot size of a reading beam used to detect the data markers.

Figure 6B:
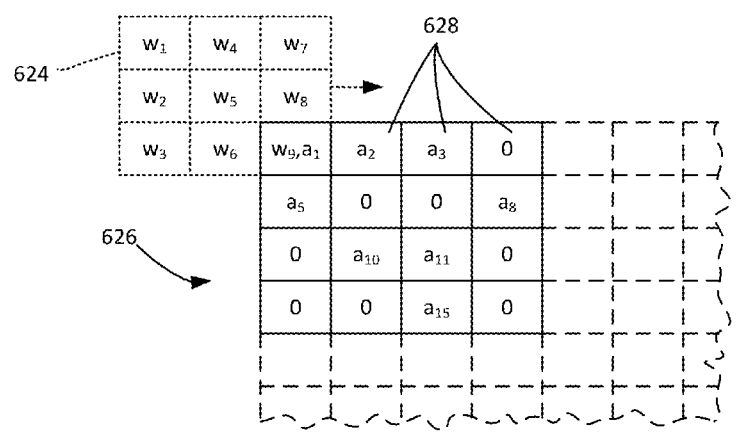
FIG. 6B is a plan view schematic of the data storage medium accessed by the data retrieval system in FIG. 6A.

For example, with additional reference to FIG. 6B, a probe beam 624 with a predetermined intensity distribution provides a grid of intensity weights $w_1$-$w_9$ that are scanned in relation to an array 626 of data markers 628 situated on the data storage medium 602. The weight matrix 616 includes a plurality of columns corresponding to each data marker 628 of the array 626. The rows of the weight matrix 616 correspond to different response illumination measurements of the measurement matrix 614. Because the probe beam 624 does not extend over the entire array 626, several values in the rows are zero. Also, a random or predetermined percentage of the values in a row that are associated with the response illumination produced by the probe beam 624 are also provided as zero or another predetermined value so as to ensure sufficient separation distance between data markers and/or sparsity in the data matrix 618. In the position of the probe beam 624 shown, a response illumination $s_1$ is produced and measured associated with the intensity weight $w_9$ of the probe beam 624. The corresponding data marker value $a_1$ is the division of $s_1$ by $w_9$. In a new position for the probe beam 624 that is one data marker or grid member translation to the right of the position of the probe beam 624 shown, the weight $w_6$ overlies the $a_1$ data marker and the weight $w_9$ overlies the $a_2$ data marker, producing corresponding variables in the second row of the weight matrix 616. At a new position three data markers 628 to the right of the position of the probe beam 624 shown, a weight $w_3$ overlies the $a_2$ data marker, a weight $w_6$ overlies the $a_3$ data marker, and a zero value is known for the $a_3$ data marker.

With known positions of zero valued data markers 628, the weight and data matrices 616, 618 form a reduced system of linear equations that can be solved using a nonnegative least squares algorithm. With the positions of the zero valued data markers 628 unknown, but present so as to make the weight matrix sufficiently sparse (e.g., 20%, 30%, 40%, 50%, 60%, 70% zeros, or greater), a compressive sensing or super resolution algorithm, such as $l_1$ minimization, can be used to determine the data values $a_{ij}$. With noise considerations, other approaches, including nonnegative lasso, or Bayesian approaches including nonnegative approximate message passing (AMP) can be used to determine the data values $a_{ij}$ with a low error rate and a sufficiently rapid convergence time or small number of iterations. In some examples, other regression analyses suitable for solving underdetermined linear systems can be used. Values for data markers 628 can include binary or multi-bit values. With multi-bit values, the intensity profile of the probe beam 624 is typically selected so that a peak intensity (e.g., $w_5$ for a Gaussian distribution) is below a saturation threshold of the data markers 628. The intensity profile can be selected to maximize the signal-to-noise sensitivity. With improved signal-to-noise sensitivity, the number of data markers 628 that are zero valued to provide sparsity can be reduced, and the density of the data storage medium increased. For data markers 628 that are binary, the intensity profile of the probe beam 624 is typically selected so as to provide full saturation for at least some of the data markers 628 under the probe beam 624.

Figure 7:
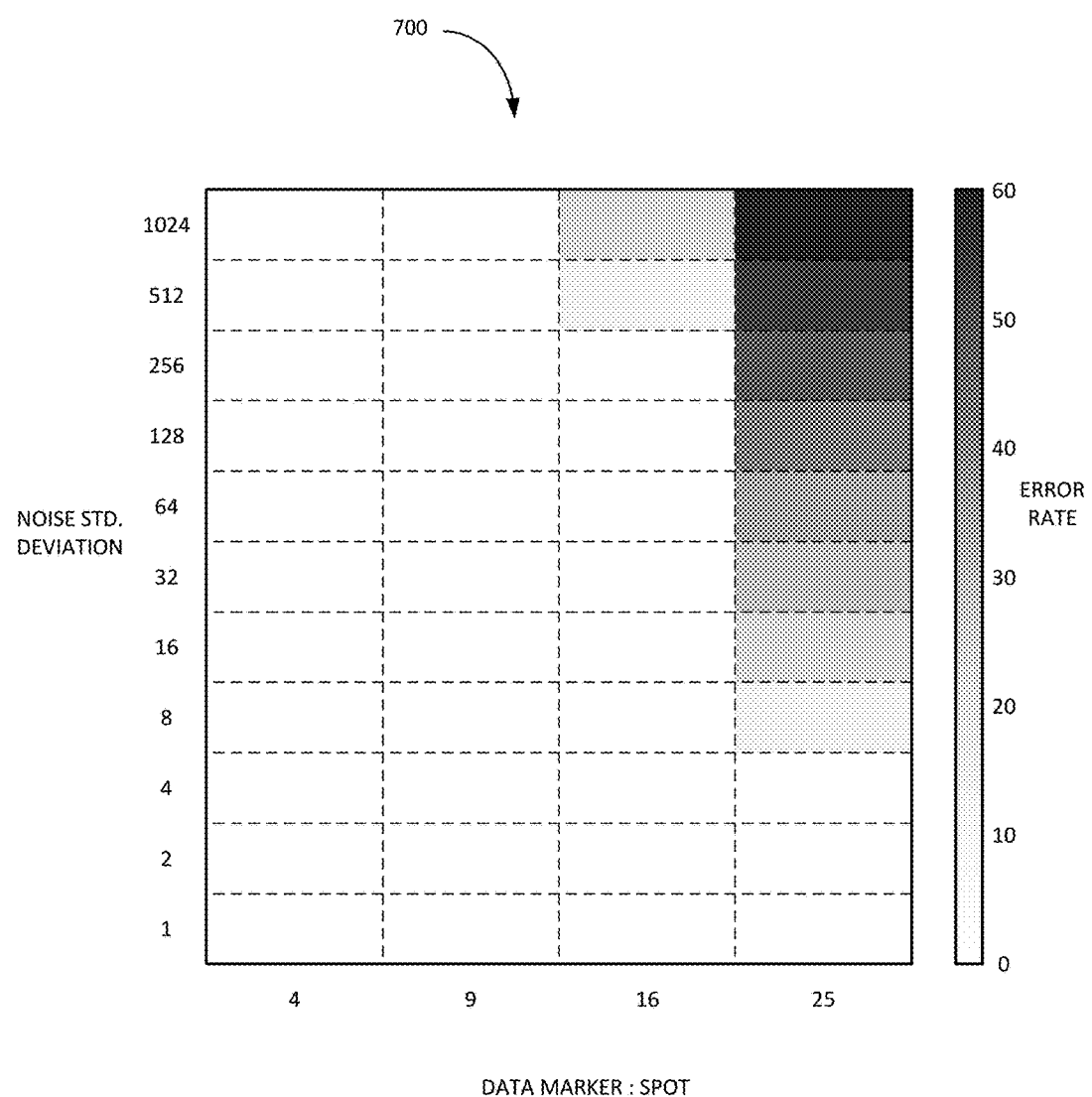
FIG. 7 is a graph of noise standard deviation and error rate for different data marker to spot size ratios.

FIG. 7 shows a graph 700 that shows average error rate results for 10 trials of a model of a system that retrieves a data signal on a data storage medium through super resolution, with 1% noise added to the data signal. The data signal is formed by a 16×16 array of data markers arranged on the data storage medium, with 50% of the data markers being zero valued and in known positions. The 1% noise can correspond to detector noise, read beam alignment, read beam source variability (e.g., jitter, mechanical vibration and instability, power source variation), lens imperfections, optical aberration, etc. The data signal has a 12-bit bit depth corresponding to a variable response illumination for the data markers after receiving a probe beam with a predetermined intensity distribution.

As shown on the horizontal axis, performance data are provided for probe beams that extend over a 2×2 array of four data markers, a 3×3 array nine data markers, a 4×4 array of sixteen data markers, and a 5×5 array of twenty-five data markers. The vertical axis on the left side of the graph 700 shows a noise standard deviation with increasing detector noise level extending over multiple illumination response levels of the probed data markers. At 1% noise for a 12-bit signal, a corresponding noise standard deviation would cover approximately 40 illumination levels. A detector noise level of up to 10-bits (1024 gray levels) is shown for the various probe beam sizes. The vertical axis on the right side and spaced apart from the graph 700 shows an error rate associated with the reconstruction of the data signal using a super resolution data deconvolution algorithm, such as lasso. In some embodiments, AMP is alternatively applicable.

As shown in the graph 700, for 2×2 probe beams and 3×3 probe beams, a 10-bit noise level provided a zero error rate in reconstructing the convolved signal. For a 4×4 probe beam, a zero error rate was provided at a detector noise level of up to 8-bit, and for a 5×5 probe beam, a zero error rate was provided at a detector noise level of up to 2-bit. Thus, a data signal corresponding to data markers arranged on a data storage medium can be effectively reconstructed after detecting the data markers with a read beam having a spot that extends over a plurality of the arranged data markers. Generally, as the bit-depth of the data markers decreases, the number of data markers by the probe spot can increase, for a fixed error rate. As the probe spot area increases to cover additional data markers in an array, additional samples are obtained for each data marker, which provides a source for error correction. As the distance between illumination data marker levels is increased (e.g., by changing the saturation level of an OSL spot), the extent of overlap between the noise standard deviation and the data signal can be decreased so as to improve error rate, or increase the number of data markers in the probe spot area that are detected.

While typical hard disks achieve very low effective error rates that can exceed 1 error in $10^{15}$ bits scanned, error correction techniques are applied during data reads to achieve this level. Actual error rates in hard disks are typically on the order of 1 in $10^4$ bits. Examples of data storage and related techniques herein can produce similarly low actual and effective error rates. Error correction techniques can include the use of error correcting codes (e.g., Reed-Solomon), parity bits, selected data structures, and one or more error correction algorithms. Error correction can be selected based on the application and expected error types. For example, some techniques can be more suitable for single-bit flips while other techniques are optimized for repeating patterns, such as head misalignment, disk scratches, etc.

Figure 8:
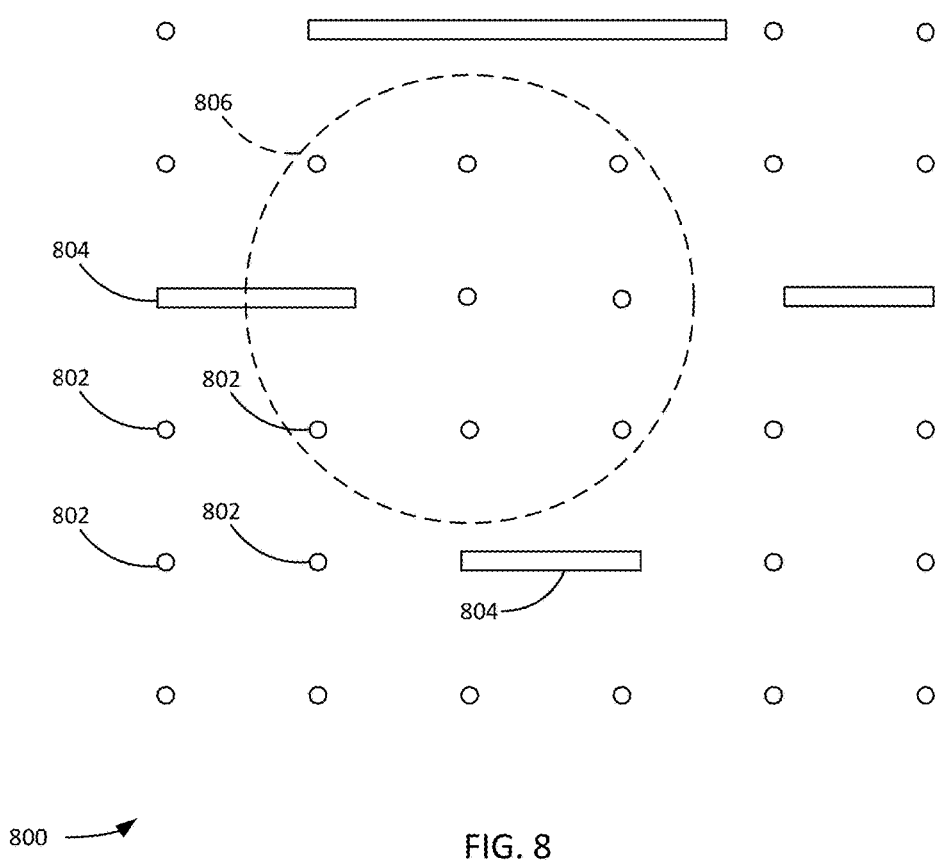
FIGS. 8-10 is a plan view schematic of an example data storage arrays.
Figure 9:
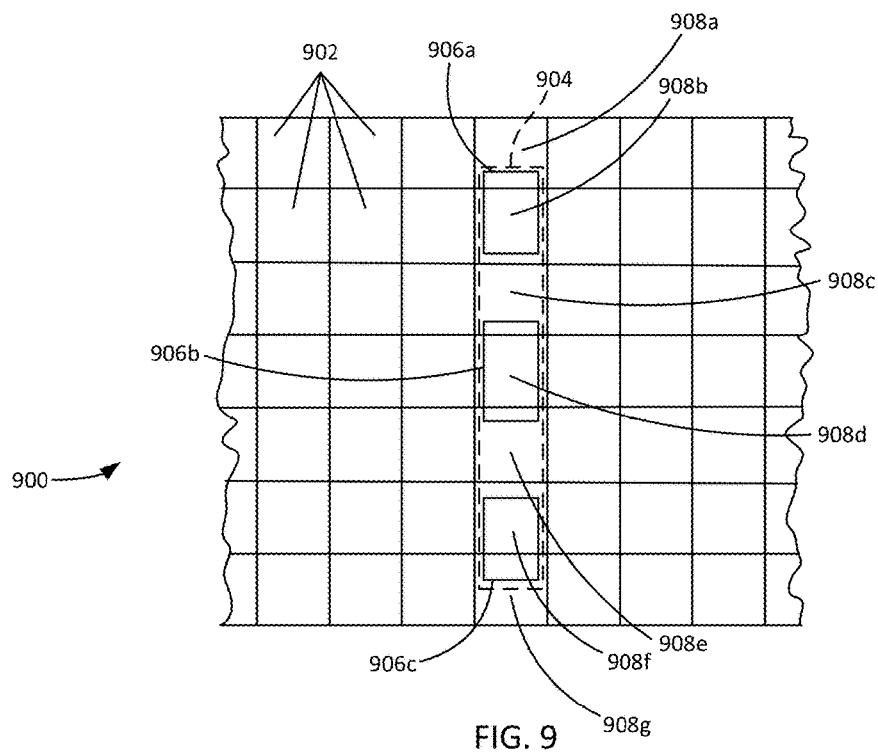

In FIG. 8, a data array 800 includes a plurality of spot data markers 802 and line data markers 804. The line data markers 804 generally extend in a direction of a scan beam 806 at various lengths corresponding to data values read by the scan beam. The scan beam has an area that extends over multiple data markers and a response illumination is provided the spot and line data markers 802, 804 that is received and measured with a detector. FIG. 9 shows a data array 900 that includes a plurality of data markers 902, organized in a grid. A probe beam 904 is produced in the form of a multi-beam interference pattern that includes a plurality of diffraction pattern members 906a-906c, such as diffraction orders arranged in a line with the orders spaced apart so as to be situated over alternate rows of data markers 902. The spaced apart diffraction pattern members 906a-906c are situated over a substantial portion of adjacent data markers 908b, 908d, 908f, and not situated over a substantial portion of adjacent data markers 908a, 908c, 908e, 908g. The probe beam 904 is scanned in the horizontal direction in the plane of FIG. 9. In further embodiments, the probe beam 904 is scanned in one or more directions in which the diffraction pattern members 906a-906c are spaced apart.

Figure 10:
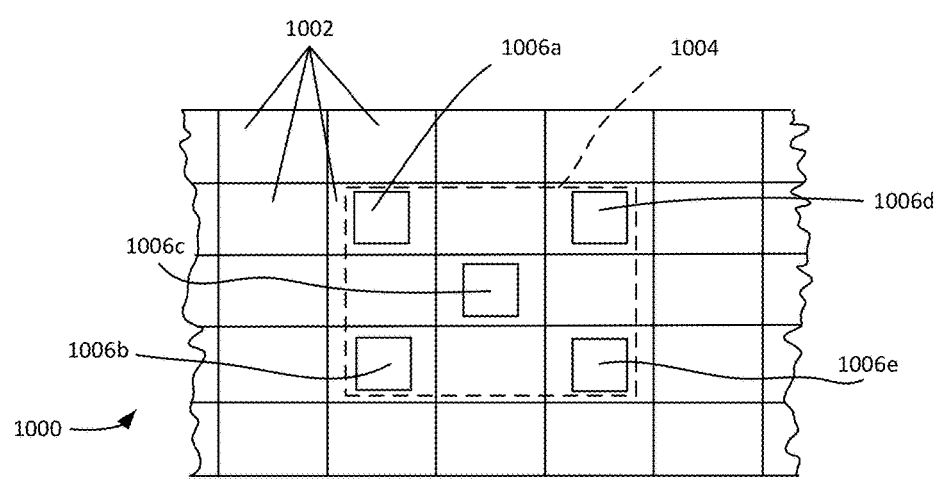

FIG. 10 shows a probe beam 1004 formed by a two-dimensional pattern of diffraction members 1006a-1006e. Various diffraction patterns can be formed, such as one-dimensional, two-dimensional, symmetric, non-symmetric, etc., and the patterned probe beams can be scanned in various directions. In representative embodiments, diffraction patterns are formed from multiple beams having wavelengths associated with diffraction limited Airy disks of the respective singular beams that extend over multiple adjacent data markers. The resulting intensity distributions of the diffraction patterns are used with one or more super resolution methods to detect response illumination from the multiple data markers with a detector, and to deconvolve the mixed response illumination data in the form of a data signal corresponding to the data values contained in the separate data markers. In typical examples, the multiple beams are polarized beams and can include polarized beams having an identical polarization state (e.g., parallel linear states).

Figure 11:
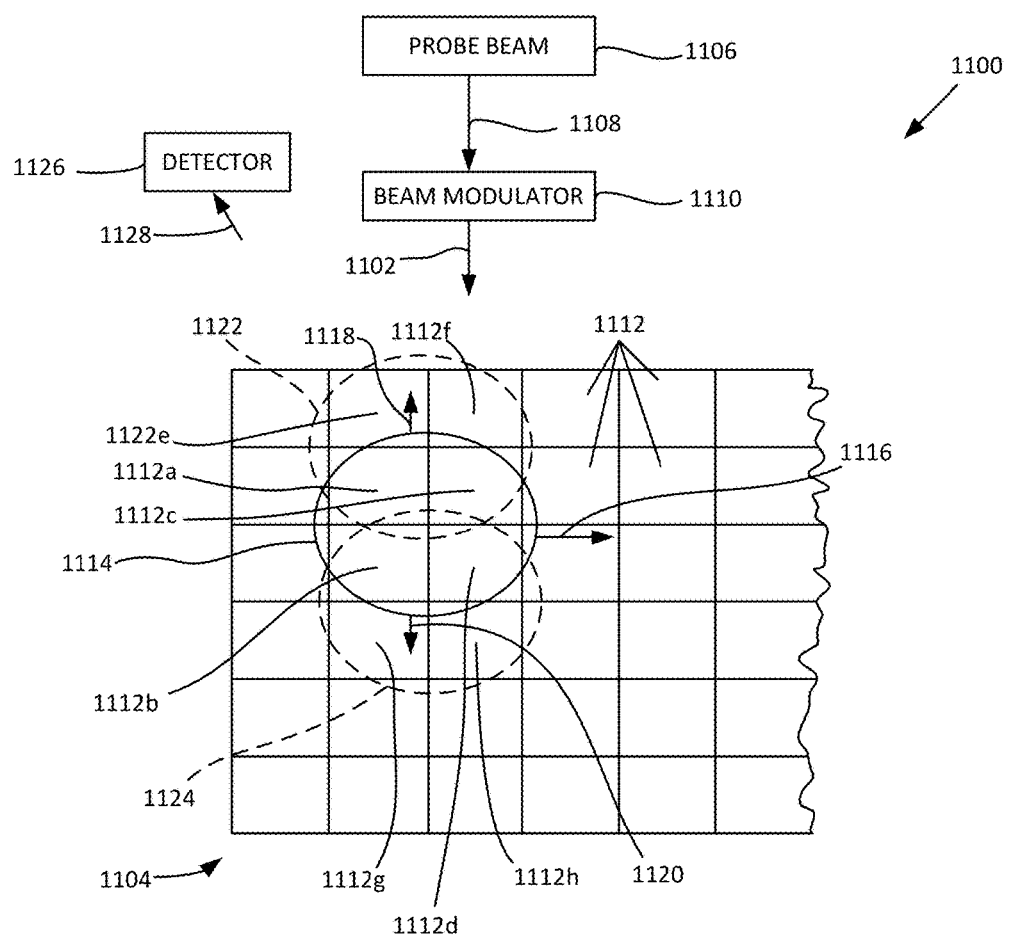
FIG. 11 is a schematic of an example data retrieval system that uses a modulated probe beam.

FIG. 11 shows a data retrieval system 1100 that produces a modulated beam 1102 that is directed to a data marker array 1104. A probe beam generator 1106 produced a probe beam 1108 that is modulated with a beam modulator 1110 to produce the modulated probe beam 1102. The data marker array 1104 includes a plurality of data markers 1112 arranged in the data marker array 1104 so that a focused spot 1114 of the modulated beam 1102 has $1/e^2$ intensity distribution that extends over a plurality of adjacent data markers 1112a-1112d. As the modulated beam 1102 is scanned relative to the data marker array 1104 in a direction to the right in FIG. 11, indicated generally by arrow 1116, the modulated beam 1102 oscillates or translates in a vertical direction in the plane of FIG. 11, indicated generally by arrows 1118, 1120. The focused spot 1114 oscillates between opposite focused positions 1122, 1124 so as to cover adjacent data markers 1112e, 1112f and 1112g, 1112h, respectively. In some examples, the modulation of the modulated beam 1102 is provided by existing jitter or vibration in the data retrieval system 1100.

In some examples, the oscillation does not completely or partially extend over additional adjacent data markers 1112e-1112h though the oscillation and corresponding variation in probe beam intensity distribution is spatially relevant to the data markers 1112. The modulation of the modulated beam 1102 is typically substantially faster than the movement of the focused spot 1114 in the scan direction 1116. A detector 1126 is situated to receive a combined response illumination 1128 from the illuminated data markers 1112a-1112h. The combined response illumination 1128 varies in accordance with the beam modulation so that the combined response illumination 1128 can be measured and compared in both the oscillation directions 1118, 1120 and the scan direction 1120. One or more super resolution algorithms can be used to deconvolve the combined response illumination 1128 to determine the values of the illuminated data markers 1112a-1112h. In some examples, by providing the probe beam 1108 as a modulated probe beam 1102, a quantity of seeded or unknown zero values for the data marker array can be reduced or eliminated.

Figure 12:
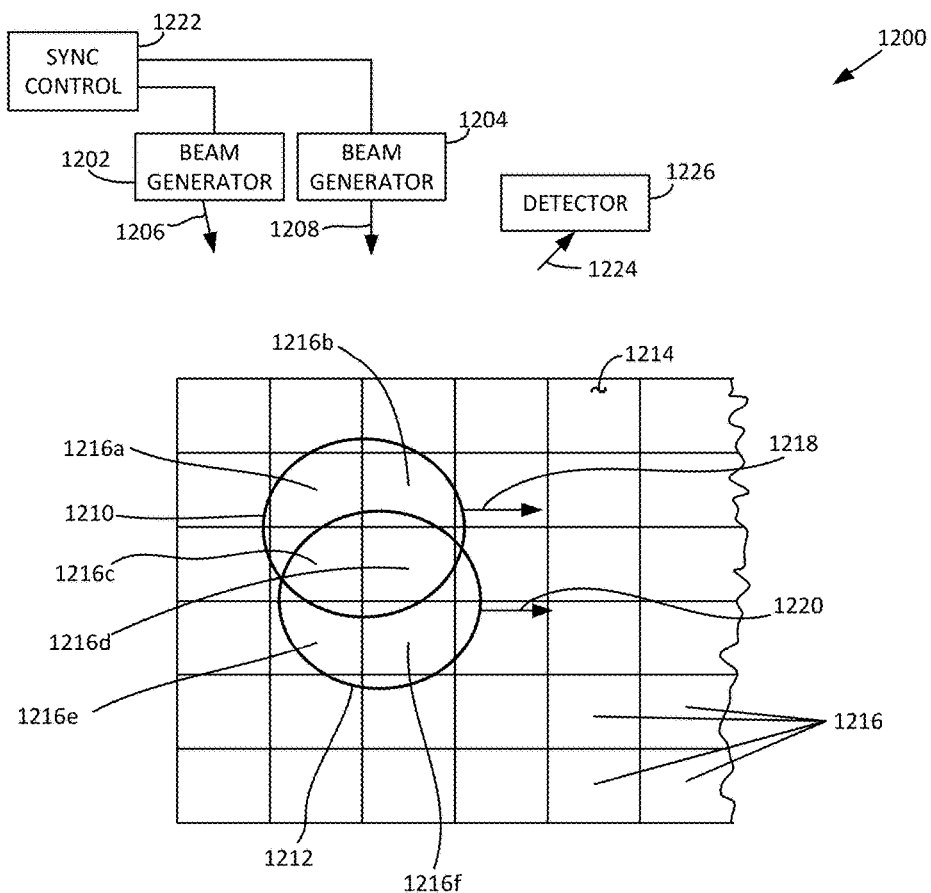
FIG. 12 is a schematic of an example data retrieval system that uses multiple probe beams.

FIG. 12 shows a multi-probe data retrieval system 1200 that includes a pair of probe beam generators 1202, 1204 situated to generate corresponding probe beams 1206, 1208 that form focused probe spots 1210, 1212 on a surface of a data storage array 1214 having a plurality of data storage markers 1216. As shown, the probe spot 1210 extends over data storage markers 1216a-1216d and the probe spot 1212 extends over data storage markers 1216c-1216f so that the probe spots 1210, 1212 are adjacently arranged so that the corresponding spot areas overlap each other and one or more data storage markers 1216, such as the data storage markers 1216c, 1216d. The probe spots 1210, 1212 are scanned relative to the data storage array 1214 in the direction shown generally by the arrows 1218, 1220, though other directions are possible.

In representative examples, the probe beams 1206, 1208 are modulated or pulsed. In further examples, the probe beams 1206, 1208 are pulsed and out of phase with respect to each other so that the data storage markers 1216 receive different probe beam intensities, including the overlapped data storage markers 1216c, 1216d. Data read accuracy can be improved based on the known phase difference between the probe beams 1206, 1208 and the known intensity variations of the probe beams 1206, 1208. With data storage markers 1216 that are OSL active regions, the phase difference can be greater than an OSL relaxation time. The modulation period or pulse repetition rate of the probe beams 1206, 1208 can be synchronized with the scan rate so as to correspond to the pitch or a fraction of the pitch of the data storage markers 1216. A sync control 1222 is coupled to the probe beam generators 1202, 1204 to control the synchronization between the probe beams 1206, 1208 and the corresponding pulse repetition rates, modulation frequencies, pulse durations, etc. A response illumination 1224 is received by a detector 1226 to form a measurement signal, and a data signal corresponding to the values of the data storage markers 1216 can be deconvolved from the measurement signal using one or more super resolution techniques so that individual data storage values can be determined.

Figure 13:
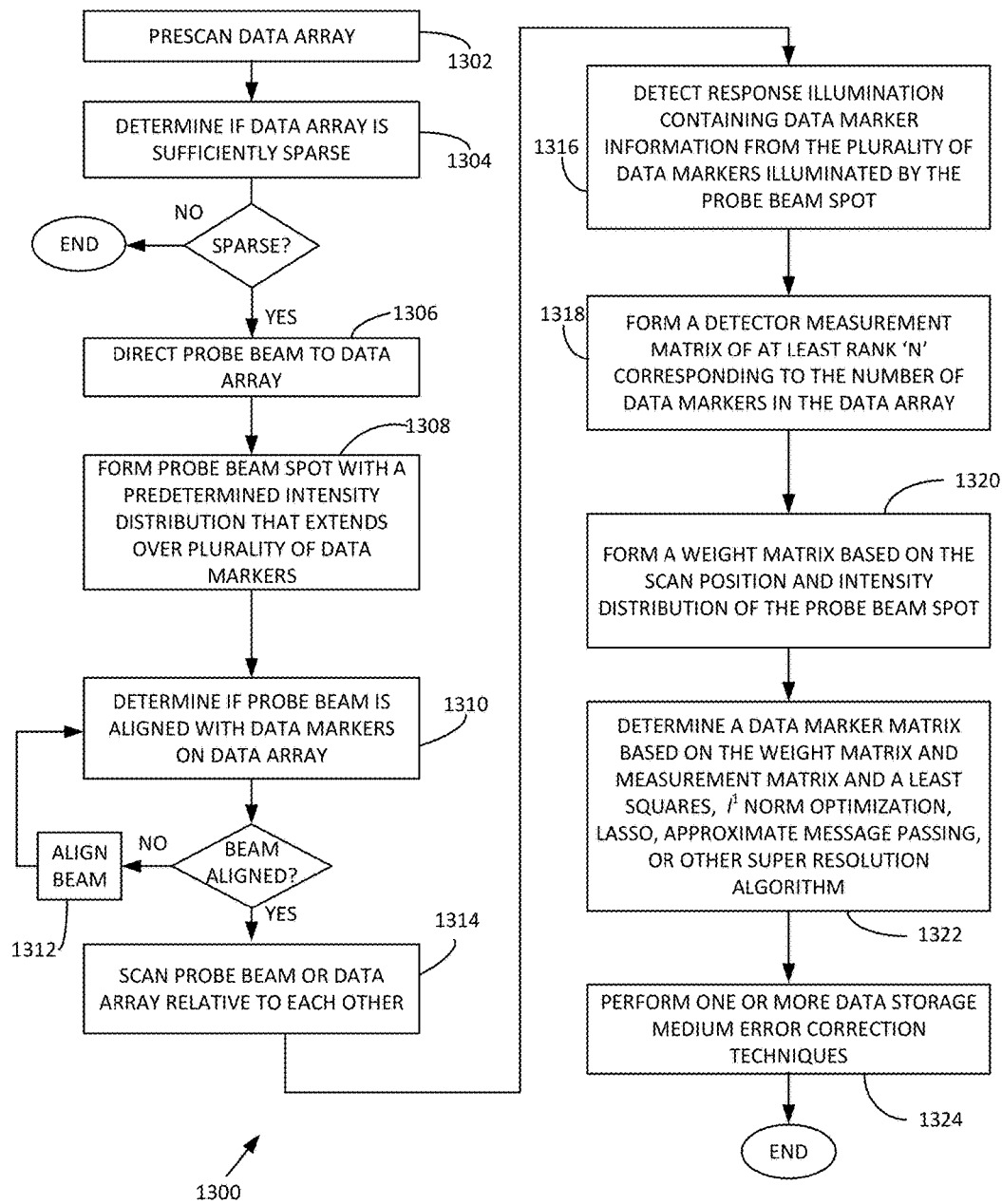
FIG. 13 is a flowchart of an example data storage medium read method.

FIG. 13 shows a flowchart of a data read method 1300 for reading data written into a data storage medium, such as an optical disc. Representative examples include reading binary or multi-bit data from OSL spots or regions. The method 1300 includes at 1302, prescanning a data array on the data storage medium, and at 1304, determining if the data array is suitably arranged for the application of one or more of the recovery techniques described herein (e.g., with respect to data marker spacing/separation and/or data marker sparsity). Data arrays that are not suitably arranged cannot be reconstructed within a reasonable time, after a suitably low number of computational iterations, or without a significant number of data errors. In some examples, the prescanning can include reading or sampling a portion of the data array to determine whether a selected percentage of data markers in the data array have a predetermined value, such as zero. In examples where a minimum spatial separation between data markers is not present, suitable percentages can be selected to ensure a suitable sparsity. In some embodiments, sufficient sparsity is provided in data arrays where greater than 20%, 30%, 40%, 50%, 60%, 70%, or a greater percentage of the data markers have a zero value. In further examples, the prescanning includes reading a start or key value associated with a pseudo-random number generator sequence that provides the corresponding location of the zero values seeded throughout the data array that provide the sparsity. Because actual data marker values can be zero, the seeded zero locations can also secure the data in the data array against scanning the data markers with a system that is unable to distinguish the actual zero-valued data markers from the seeded ones.

At 1306, a probe beam used to access the data on the data storage medium is directed to the data array. At 1308, a probe beam spot is formed with the probe beam that has a predetermined optical intensity distribution that extends over plurality of data markers of the data marker array. At 1310, a data marker and probe beam alignment is sensed so as to determine if the probe beam is properly situated over the plurality of data markers. For example, a track of alignment data markers with a predetermined data signature can be provided in or adjacent to the data array so that a response detected at a detector is compared with an expected value. If the beam is not in alignment, at 1312 the probe beam can be brought into alignment with the data markers of the data array. The properly aligned probe beam or the data array (or both) is scanned, at 1314, relative to each other.

At 1316, a response illumination is detected that contains data marker information from the plurality of data markers illuminated by the probe beam spot. Subsequent pluralities of data markers provide corresponding response illuminations as the probe beam spot is scanned. A detector measurement matrix of data is compiled, at 1318, which is at least rank 'N' where N corresponds to the number of data markers in the data array being measured. In some examples, multiple passes of the data markers in the data array can be performed to correct errors or to oversample and improve data reconstruction accuracy. A weight matrix is formed at 1320 based on the scan position and intensity distribution of the probe beam spot. At 1322, a data marker matrix corresponding to the values of the data markers is determined based on the weight and measurement matrices and a super resolution algorithm. Thus, the values associated with the data markers can be recovered using a probe beam that is larger than the spacing of the data markers in the data array and a detector that receives a mixed signal associated with the data markers.

Figure 14:
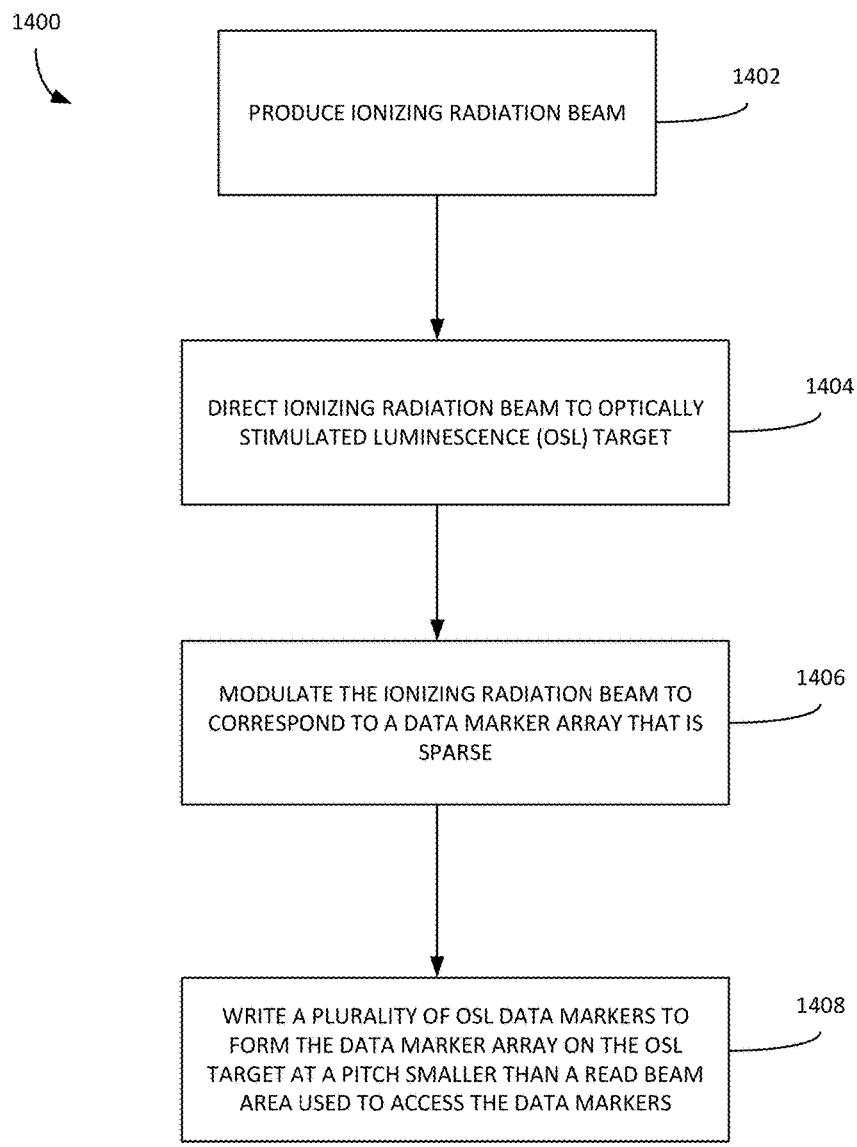
FIG. 14 is a flowchart of an example data storage medium write method.

FIG. 14 shows a flowchart of a data write method 1400 for writing data into an OSL data storage medium. At 1402, an ionizing radiation beam is produced with a selected set of parameters associated with the formation of OSL data markers on an OSL target. Ionizing radiation beams, such as electron beams, can generally be focused to a spot size from approximately 10 nm to 50 nm, which is below the spot size of a diffraction limited read beam operating at an optical wavelength of 400 nm or longer. For OSL targets, ionizing radiation beam characteristics such as beam density, particle quantity, particle velocity, etc., can correspond to the response illumination characteristics of a response illumination beam generated by the OSL data marker formed with the selected ionizing radiation beam characteristics. At 1404, the ionizing radiation beam is directed to the OSL target. At 1406, the ionizing radiation beam is modulated to correspond to an OSL data marker array that includes a plurality of the OSL data markers and that satisfies a sparsity or separation condition associated with one or more super resolution techniques used to retrieve the data stored in the OSL data marker array. At 1408, the plurality of OSL spots of the data marker array are written into the OSL target at a pitch that is smaller than a read beam area used to access the OSL data markers.

The algorithms described herein may be, for example, embodied as software or firmware instructions carried out by a digital computer. For instance, any of the disclosed super resolution techniques can be performed by a computer or other computing hardware (e.g., an ASIC, FPGA, CPLD, processor, etc.) that is part of a data storage read system. The data storage read system can be connected to or otherwise in communication with the data storage medium (e.g., a target array of OSL spots) and be programmed or configured to read the data storage medium and perform the desired super resolution computations (e.g., one or more of the super resolution techniques disclosed herein). The computer can be a computer system comprising one or more processors (processing devices) and tangible, non-transitory computer-readable media (e.g., one or more optical media discs, volatile memory devices (such as DRAM or SRAM), or nonvolatile memory or storage devices (such as hard drives, NVRAM, and solid state drives (e.g., Flash drives)). The one or more processors can execute computer-executable instructions stored on one or more of the tangible, non-transitory computer-readable media, and thereby perform any of the disclosed techniques. For instance, software for performing any of the disclosed embodiments can be stored on the one or more volatile, non-transitory computer-readable media as computer-executable instructions, which when executed by the one or more processors, cause the one or more processors to perform any of the disclosed super resolution techniques. The results of the computations can be stored (e.g., in a suitable data structure or lookup table) in the one or more tangible, non-transitory computer-readable storage media and/or can also be used by other software programs or output to the user, for example, by displaying, on a display device, data read from the data storage medium.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

We claim:

1. A method, comprising:
   directing a probe beam to a target that includes an array of data portions in a data storage medium arranged so that a beam area of the probe beam extends across a plurality of adjacent data portions, wherein the adjacent data portions are responsive to the probe beam to produce a mixed response illumination;
   detecting the mixed response illumination at a detector; and
   determining data values corresponding to the plurality of adjacent data portions based on the detected mixed response illumination.

2. The method of claim 1, wherein the data portion subset are optically stimulated luminescence (OSL) active regions.

3. The method of claim 1, wherein the array includes a predetermined data portion subset with each predetermined data portion having a predetermined response illumination characteristic and wherein the position and/or quantity of the predetermined data portions is associated with a confidence level for the determining of the data values.

4. The method of claim 3, wherein the predetermined response illumination characteristic corresponds to a zero data value.

5. The method of claim 2, wherein at least a portion of the OSL active regions are situated to provide a multi-bit response illumination.

6. The method of claim 2, wherein the OSL active regions at least a portion of the OSL active regions are situated to provide a multi-wavelength response illumination.

7. The method of claim 6, further comprising comparing a first wavelength signal and a second wavelength signal of the multi-wavelength response illumination.

8. The method of claim 1, wherein the probe beam has a wavelength of 300 nm or greater.

9. The method of claim 1, wherein the probe beam is a diode laser beam.

10. The method of claim 1, wherein the determining data values includes using one or more super resolution algorithms to deconvolve the data values from the detected mixed response illumination.

11. The method of claim 10, wherein the one or more super resolution algorithms includes nonnegative least squares, least absolute shrinkage and selection operator (lasso), and approximate message passing.

12. The method of claim 1, wherein the receiving the mixed response illumination includes sampling the mixed response illumination with the detector at selected times or time intervals corresponding to the position of the probe beam relative to the array of data portions.

13. The method of claim 1, wherein the probe beam is a continuous laser beam and the mixed response illumination corresponds to a modulated signal.

14. The method of claim 1, wherein the probe beam extending across a plurality of adjacent data portions is a diffraction pattern providing a segmented intensity distribution.

15. The method of claim 14, wherein the segmented intensity distribution includes a plurality of diffraction portions extending over the plurality of adjacent data portions and wherein at least a portion of one or more data portions interposed between the plurality of adjacent data portions are not covered by the diffraction portions.

16. The method of claim 1, further comprising modulating the probe beam so as to provide a movement in a direction different from a probe beam scan direction.

17. The method of claim 1, wherein the probe beam is a first probe beam and wherein the plurality of adjacent data portions is a first plurality of adjacent data portions, the method further comprising directing a second probe beam to the target so as to be adjacent to the first probe beam and so as to extend over a second plurality of adjacent data portions that overlaps at least a portion of the first plurality of adjacent data portions.

18. The method of claim 10, further comprising prescanning the array of data portions and determining if the array of data portions satisfies a sparsity and/or separation condition associated with the one or more super resolution algorithms.

19. The method of claim 18, wherein the prescanning includes reading one or more data markers that are associated with a mapping of a plurality of seeded data portions in the array of data portions.

20. The method of claim 18, wherein the prescanning includes reading with the probe beam at least a portion of the array of data portions so as to determine if a percentage of the portion satisfies the sparsity condition.

21. The method of claim 1, further comprising aligning the probe beam with the array of data portions.

22. The method of claim 1 further comprising, scanning the probe beam and the array of data portions relative to each other so that the probe beam extends across a different plurality of adjacent data portions.

23. The method of claim 1, wherein the detector produces a mixed illumination signal corresponding to the detected mixed response illumination.

24. An apparatus, comprising:
   a data storage medium that includes an array of data markers;
   a probe beam source situated to produce a probe beam having a beam area at the array that extends over a plurality of data markers;
   a scanner situated to scan the probe beam across the array of data markers;

an optical detector situated to detect a response illumination produced by the plurality of data markers in response to the probe beam and provide a mixed response illumination signal; and a computer configured with a super resolution solver so as to determine values of the array of data markers based on the mixed response illumination signal.

25. The apparatus of claim 24, wherein the array of data markers includes OSL active regions.

26. A system, comprising:

a memory coupled to at least one processor, the memory storing matrix data associated with an array of data markers of a storage medium; and a computer-implemented super resolution solver, stored in the memory, the super resolution solver for determining values stored in the data markers of the array based on a plurality of mixed response illumination probe beam measurements of the array, wherein an area of the probe beam extends over a plurality of adjacent data markers of the array to produce the mixed response illumination so that signal portions of the adjacent data markers in the mixed response illumination probe beam measurements are used by the super resolution solver to determine the values of the adjacent data markers.

27. The system of claim 26, wherein the array of data markers includes OSL active regions.

28. The system of claim 26, wherein the values stored have a bit depth greater than 1.

29. The system of claim 26, wherein the super resolution solver uses one or more of nonnegative least squares, least absolute shrinkage and selection operator (lasso), and approximate message passing algorithms.

30. An apparatus, comprising:

an optically stimulated luminescence (OSL) storage medium including an array of OSL data markers situated to illuminate in response to optical stimulation;

a probe beam source coupled to the OSL storage medium and situated to produce a probe beam spot that extends over a plurality of OSL data markers in the array so as to provide optical stimulation to the plurality of the OSL data markers;

a detector coupled to the array and situated to detect a mixed illumination response beam corresponding to the optical stimulation of the plurality of OSL data markers; and a processor configured to determine values of the plurality of OSL data markers based on the detected mixed illumination response beam.

31. The apparatus of claim 30, wherein the OSL storage medium is an optical disc.

32. A data storage medium, comprising:

an array of data portions configured on a substrate to receive a beam area of a probe beam configured to read the array of data portions by extending as a diffraction limited spot across a plurality of adjacent data portions and causing each of the adjacent data portions to emit a respective component illumination associated with a data value to produce a mixed response illumination configured to be detectable so that the data values are deconvolvable from the detected mixed response illumination.

33. The data storage medium of claim 32, wherein the data portion subset are optically stimulated luminescence (OSL) active regions.

34. The data storage medium of claim 33, wherein at least a portion of the OSL active regions are situated to provide a multi-bit response illumination.

35. The data storage medium of claim 32, wherein the array of data portions is configured such that the data values are deconvolvable from the mixed response illumination using one or more super resolution algorithms.

* * * * *

UNITED STATES PATENT AND TRADEMARK OFFICE
CERTIFICATE OF CORRECTION

PATENT NO. : 10,295,677 B2  
APPLICATION NO. : 15/589413  
DATED : May 21, 2019  
INVENTOR(S) : Gotthold et al.

Page 1 of 1

It is certified that error appears in the above-identified patent and that said Letters Patent is hereby corrected as shown below:

In the Claims

Column 19, Lines 58-60, Claim 6 "The method of claim 2, wherein the OSL active regions at least a portion of the OSL active regions are situated to provide a multi-wavelength response illumination." should read --The method of claim 2, wherein at least a portion of the OSL active regions are situated to provide a multi-wavelength response illumination.--

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*